United States Patent
Ito

(10) Patent No.: US 10,148,839 B2
(45) Date of Patent: Dec. 4, 2018

(54) IMAGE FORMING APPARATUS, CONTROL METHOD OF IMAGE FORMING APPARATUS, AND NON-TRANSITORY RECORDING MEDIUM

(71) Applicant: KONICA MINOLTA, INC., Chiyoda-ku, Tokyo (JP)

(72) Inventor: Hiroyasu Ito, Okazaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/685,020

(22) Filed: Aug. 24, 2017

(65) Prior Publication Data

US 2018/0069979 A1    Mar. 8, 2018

(30) Foreign Application Priority Data

Sep. 6, 2016    (JP) .................................. 2016-173296

(51) Int. Cl.
*H04N 1/00*    (2006.01)

(52) U.S. Cl.
CPC ..... *H04N 1/00891* (2013.01); *H04N 1/00904* (2013.01); *H04N 2201/0094* (2013.01)

(58) Field of Classification Search
CPC ........... H04N 1/00891; H04N 1/00904; H04N 2201/0094
See application file for complete search history.

(56) References Cited

U.S. PATENT DOCUMENTS

| | | | | |
|---|---|---|---|---|
| 9,063,716 | B2* | 6/2015 | Okabe | G03G 15/5004 |
| 2011/0052243 | A1* | 3/2011 | Suzuki | G03G 15/5004 |
| | | | | 399/88 |

FOREIGN PATENT DOCUMENTS

| | | |
|---|---|---|
| JP | 2003-015780 A | 1/2003 |
| JP | 2013-020606 A | 1/2013 |
| JP | 2013-222394 A | 10/2013 |

* cited by examiner

*Primary Examiner* — Kent Yip
(74) *Attorney, Agent, or Firm* — Buchanan Ingersoll & Rooney PC

(57) ABSTRACT

An MFP (an image forming apparatus) includes a main CPU that performs a predetermined process before switching the MFP to a power supply stop state, in response to a turn-off operation on a main power switch of the MFP, and a sub CPU that controls supply of power to individual units of the MFP in response to a command from the main CPU by a power relay and a power control IC. The sub CPU monitors the operating state of the main CPU after the turn-off operation on the main power switch. After the turn-off operation, even if a power supply stop command from the main CPU is not received, if a predetermined condition related to the result of the monitoring of the operating state of the main CPU is satisfied, the sub CPU performs forced turn-off control for forcibly stopping supply of power to the individual units.

10 Claims, 20 Drawing Sheets

FIG. 15

| APPARATUS STATE | OPERATING STATE OF MAIN CPU | HDD | USB DEVICE | SCANNER | PRINT ENGINE | PANEL | RAM |
|---|---|---|---|---|---|---|---|
| STARTUP STATE | ○(6) | ○(4) | ○(5) | ○(3) | ○(2) | ○(1) | ○(7) |
| FIRST POWER SAVING STATE (WHEN MAIN CPU 31 IS OPERATING) | ○(2) | — | ○(1) | — | — | — | ○(3) |
| SECOND POWER SAVING STATE (WHEN MAIN CPU 31 IS OPERATING) | — | — | — | — | — | — | ○ |
| OFF STATE | — | — | — | — | — | — | — |

FIG. 17

| APPARATUS STATE | OPERATING STATE OF MAIN CPU | HDD | USB DEVICE | SCANNER | PRINT ENGINE | PANEL | RAM |
|---|---|---|---|---|---|---|---|
| STARTUP STATE | ○(5) | — | ○(4) | ○(3) | ○(2) | ○(1) | ○(6) |
| FIRST POWER SAVING STATE (WHEN MAIN CPU 31 IS OPERATING) | ○(2) | — | ○(1) | — | — | — | ○(3) |
| SECOND POWER SAVING STATE (WHEN MAIN CPU 31 IS OPERATING) | — | — | — | — | — | — | ○ |
| OFF STATE | — | — | — | — | — | — | — |

IMAGE FORMING APPARATUS, CONTROL METHOD OF IMAGE FORMING APPARATUS, AND NON-TRANSITORY RECORDING MEDIUM

CROSS-REFERENCE TO RELATED APPLICATIONS

Japanese Patent Application No. 2016-173296 filed on Sep. 6, 2016 including description, claims, drawings, and abstract the entire disclosure is incorporated herein by reference in its entirety.

BACKGROUND

Technological Field

The present invention relates to an image forming apparatus such as an MFP (Multi-Functional Peripheral) and a technology related thereto.

Description of the Related Art

There are high-speed startup technologies for making the functions of an MFP usable in a short time such that a user can use them, if the main power of the MFP is turned on (see JP 2013-222394 A and JP 2013-20606 A).

In these high-speed startup technologies, supply of power is not immediately stopped in response to a turn-off operation on a main power switch, and a period (a power supply duration) for continuing supply of power even after the turn-off operation is set, and a process of storing apparatus state information (hereinafter, also referred to as saving object information) in the set period is performed. More specifically, when the main power switch is turned off, a process of storing apparatus state information (such as data stored in a RAM of a controller and data stored in registers of individual processing units) in a non-volatile storage unit (hereinafter, also referred to as a snapshot data acquiring process) is performed for a case where the main power switch is turned on again. Then, if the snapshot data acquiring process finishes, in response to a command from a CPU, supply of power to the image forming apparatus is stopped. Thereafter, if the main power switch is turned on again, a startup process (a high-speed startup process) is performed using the apparatus state information (snapshot data) acquired in the last snapshot data acquiring process. Therefore, the MFP can quickly reach (return to) a startup state (specifically, a state in which it is possible to perform jobs (a ready state)).

In such high-speed startup technologies, when the snapshot data acquiring process or the like is performed in response to a turn-off operation on the main power switch, if a certain situation occurs, for example, the CPU runs out of control, whereby it becomes impossible to transmit a power-off command from the CPU, it may become impossible to stop supply of power to the image forming apparatus.

In contrast with this, JP 2003-15780 A discloses a technology for forcibly turning off the power of an electronic device in a case where a power stop signal is not output from firmware in a predetermined time (a second time (for example, 7 seconds to 15 seconds) after a power stop signal is output by continuously pushing the power switch for a predetermined time (a first time (2 seconds to 5 seconds)).

However, the technology of JP 2003-15780 A just determines whether the predetermined time (the second time (7 seconds to 15 seconds)) has elapsed after the power switch was continuously pushed for the predetermined time (the first time). In other words, it just estimates occurrence of an abnormal state in the CPU only on the basis of the elapsed time from a power-off operation. For this reason, for example, even in a case where the CPU does not actually run out of control and processing of the CPU is just slightly delayed, the power of the electronic device may be forcibly turned off. Like this, the technology of JP 2003-15780 A has room for improvement.

SUMMARY

Therefore, an object of the present invention is to provide a technology capable of more appropriately turning off the power of an image forming apparatus in a case where a predetermined process is further performed after a turn-off operation on the main power switch.

To achieve the abovementioned object, according to an aspect, an image forming apparatus reflecting one aspect of the present invention comprises: a main CPU that performs a predetermined process before switching the image forming apparatus to a power supply stop state, in response to a turn-off operation on a main power switch of the image forming apparatus; and a sub CPU that controls supply of power to individual units of the image forming apparatus on the basis of a command from the main CPU, wherein the sub CPU monitors the operating state of the main CPU after the turn-off operation, and after the turn-off operation, even if a power supply stop command from the main CPU is not received, if a predetermined condition related to the result of the monitoring of the operating state of the main CPU is satisfied, the sub CPU performs forced turn-off control for forcibly stopping supply of power to the individual units.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

FIG. 15 is a view illustrating a data table (a control list) defining a power supply stop order.

FIG. 17 is a view illustrating a data table (a control list) defining a power supply stop order.

DETAILED DESCRIPTION OF EMBODIMENTS

Hereinafter, one or more embodiments of the present invention will be described with reference to the drawings. However, the scope of the invention is not limited to the disclosed embodiments.

<1. First Embodiment>
<1-1. Configuration of Apparatus>

Figure 1:
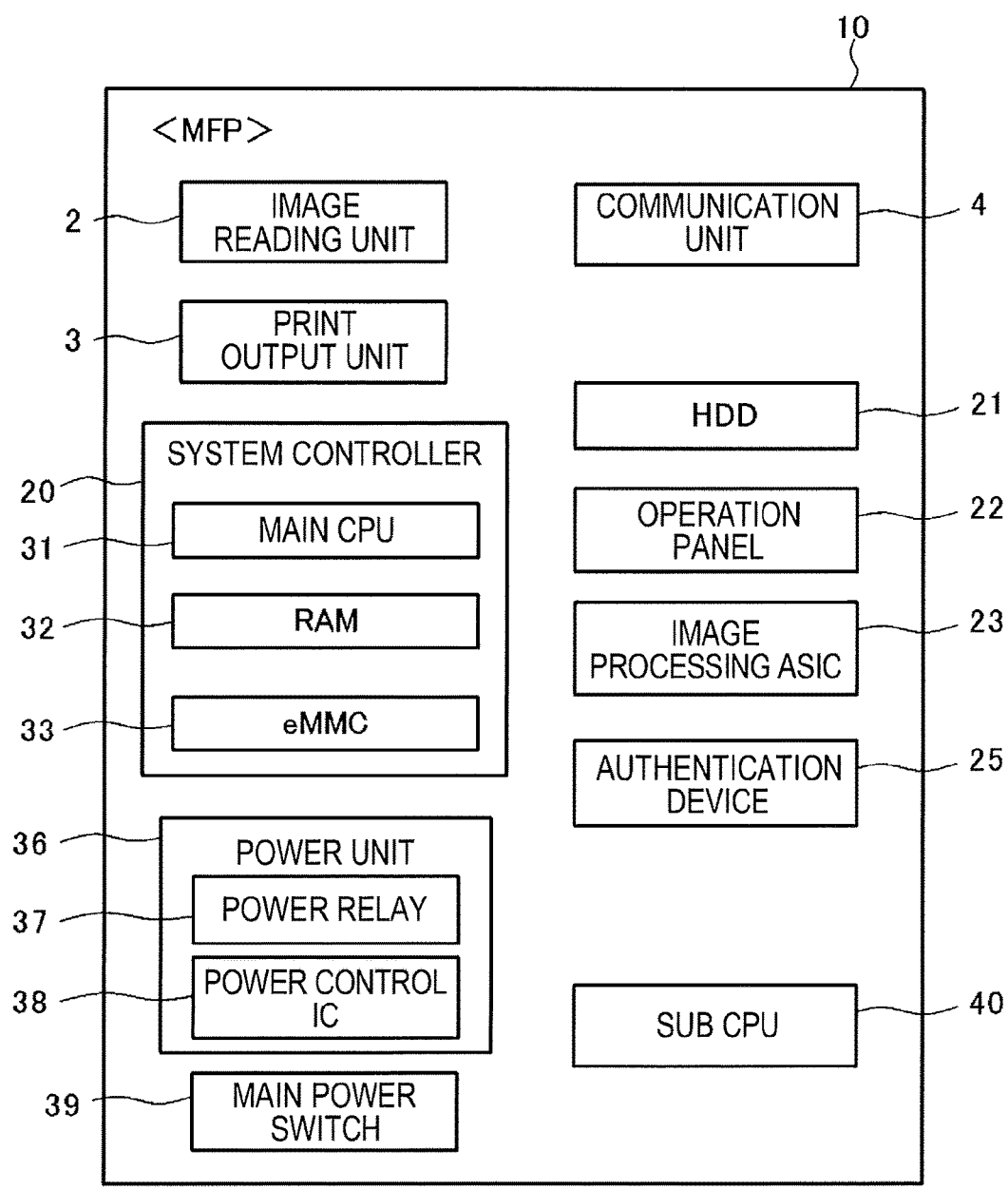
FIG. 1 is a view illustrating functional blocks of an MFP (an image forming apparatus).
Figure 2:
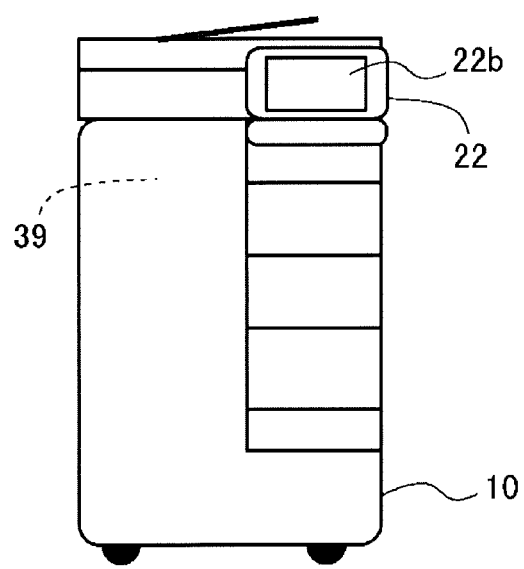
FIG. 2 is a view illustrating the external appearance of the MFP.

FIG. 1 is a view illustrating functional blocks of an image forming apparatus 10. Here, as an example of the image forming apparatus 10, an MFP (Multi-Functional Peripheral) is taken. Also, FIG. 2 is a view illustrating the external appearance of an MFP 10.

The MFP 10 is an apparatus having various functions such as a scan function, a copy function, a facsimile function, and a box storage function (also referred to as a multi-function apparatus). Specifically, the MFP 10 includes an image reading unit 2, a print output unit 3, a communication unit 4, a system controller 20, a HDD (hard disk drive) 21, an operation panel unit 22, an image processing ASIC 23, an authentication device 25, a power unit 36, and so on as shown in the functional block diagram of FIG. 1 and multiply operates those units, thereby implementing various functions.

The image reading unit 2 is a processing unit configured to optically read (i.e. scan) a document mounted on a predetermined position of the MFP 10 and generate image data on the corresponding document (also referred to as a document image or a scan image). The image reading unit 2 will also be referred to as a scan unit.

The print output unit 3 is an output unit configured to print images on various media such as paper on the basis of data on print objects.

The communication unit 4 is a processing unit capable of performing facsimile communication through a public line. Further, the communication unit 4 can also perform communication through a communication network (network communication).

The HDD (hard disk drive) 21 is a non-volatile storage device (storage unit) having a relatively large capacity, and can save a large amount of data such as images.

The operation panel unit 22 is an operation unit having a touch panel 22b on the front side as shown even in FIG. 2. The touch panel 22b is configured by burying various sensors and the like in a liquid crystal display panel, and can display a variety of information and receive various operation inputs from an operator. In other words, the touch panel 22b is a display unit for displaying a variety of information and is also an operation input unit for receiving operation inputs from a user.

The image processing ASIC (application specific integrated circuit) 23 is an integrated circuit for image processing. The image processing ASIC 23 can perform a variety of image processing (such as a y adjustment process, a color adjustment process, and an image compression process) on image data.

The authentication device 25 is an authentication device (a user authentication device) which is connected to the main body of the MFP 10 in a USB connection manner or the like. As the authentication device 25, devices using various user authentication systems such as a card authentication system or a vein authentication system can be used.

The system controller 20 is a control device which is built in the MFP 10 and generally control the MFP 10. The system controller 20 is configured as a computer system having a main CPU 31, various semiconductor memories (volatile memories such as the RAM 32 and non-volatile memories such as an eMMC (Embedded Multi Media Card) 33), and so on. The system controller 20 implements various processing units by reading out software programs (hereinafter, also referred to simply as programs) from the eMMC 33 and executing them in the main CPU 31. Also, the corresponding programs (specifically, a program module group) may be installed in the MFP 10 through a communication network. Alternatively, the corresponding programs may be recorded on a portable recording medium such as a USB memory, and be read out from the recording medium, and be installed in the MFP 10.

Figure 3:
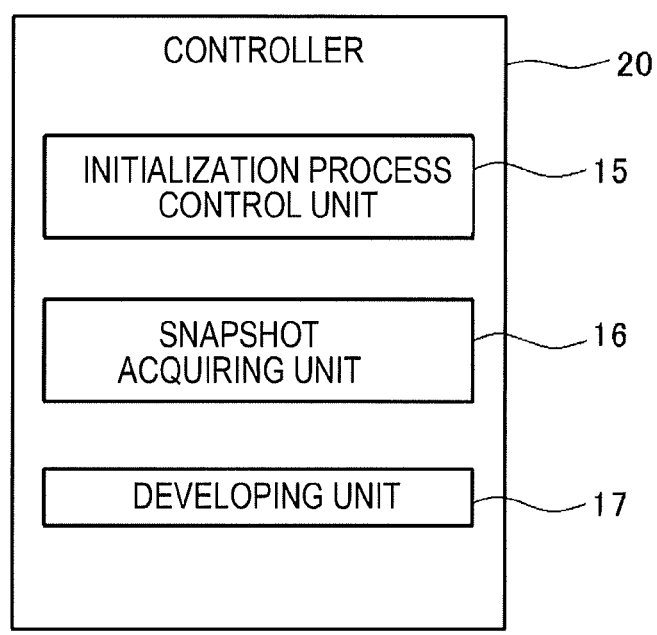
FIG. 3 is a view illustrating various functional processing units which are implemented by a system controller.

Specifically, the system controller (the main CPU 31 and so on) 20 implements various processing units including an initialization process control unit 15, a snapshot acquiring unit 16, and a developing unit 17 as shown in FIG. 3 by executing the abovementioned programs.

The initialization process control unit 15 is a processing unit configured to perform an initialization process on each device of the MFP 10.

The snapshot acquiring unit 16 is a processing unit for acquiring apparatus use information related to processing units which are objects of a snapshot data acquiring process (for example, all connected devices including devices connected to the MFP 10 at that moment (devices related to option components)) (information to be used in the MFP 10 (including the connected devices)), as snapshot data. The snapshot acquiring unit 16 stores (saves) the apparatus use information related to the individual units of the MFP 10, as "snapshot data", in the eMMC 33. Also, since the apparatus use information is information which is an object of a saving process, the corresponding information will also be referred to as "saving object information".

The developing unit 17 performs a high-speed startup process in cooperation with the initialization process control unit 15 and so on, if necessary. For example, after a power-off operation is performed on the MFP 10, if the next power-on operation is performed, the developing unit 17 develops snapshot data acquired in a snapshot data acquiring process immediately after the power-off operation, in the MFP 10. Use of the snapshot data makes it possible to quickly start up the MFP 10.

Also, the MFP 10 has a main power switch 39. The main power switch 39 (a power switch) is a switch for switching the MFP 10 between an ON state and an OFF state. As the main power switch 39, for example, a seesaw type switch can be used. Also, the main power switch 39 is installed at a part of the main body of the MFP 10 covered with an openable and closable cover member (inside the cover member), for example, so as not to be erroneously operated.

The power unit 36 includes an AC to DC converter (not shown in the drawings), and can use the AC to DC converter to supply power supplied from an AC power (DC power obtained by conversion) to individual units of the MFP 10 (such as the main CPU 31, the RAM 32, the eMMC 33, a sub CPU 40, and other processing units 21, 22, 23, 25, 2, 3, and 4). Also, the power unit 36 includes a power relay 37 and a power control IC 38. The power relay 37 (such as an electromagnetic relay) switches supply of power to the power control IC 38 between an ON state and an OFF state. The power control IC 38 is an IC for controlling supply of power to the individual units of the MFP 10, and uses power supplied from the power relay 37 to control supply of power to the individual units of the MFP 10. If supply of power to the power control IC 38 is stopped due to a turn-off operation on the power relay 37, supply of power from the power control IC 38 to the individual units included in the MFP 10 is stopped at the same time. The power unit 36 controls supply of power to the individual units of the MFP 10 in cooperation with the main CPU 31, the sub CPU 40 (to be described below), and so on.

Also, the MFP 10 has the sub CPU 40. When the MFP 10 is in a non-stopped state (including a ready state, a sleep state, and so on), power is always supplied to the sub CPU 40 (the sub CPU 40 operates in a power-on state), and thus the sub CPU 40 can perform various operations (such as a monitoring process and a determining process). For example, the sub CPU 40 can monitor the operating state of the main CPU 31 and the operated state of the main power switch 39, and can control supply of power to the individual units of the MFP 10 in cooperation with the power unit 36 and so on.

The sub CPU 40 executes programs stored in a storage unit (not shown in the drawings) which is under the control of the sub CPU, thereby implementing various processing units (such as the power control unit). The power control unit controls a power supply operation of the MFP 10 in cooperation with the power unit 36. Also, the corresponding programs (specifically, a program module group) may be installed in the MFP 10 through a communication network. Alternatively, the corresponding programs may be recorded on a portable recording medium such as a USB memory, and be read out from the recording medium, and be installed in the MFP 10.

<1-2. Operations>
<State of MFP (Such as Ready State and Power Saving State)>

The MFP 10 has at least three states (apparatus states) Q0, Q1, and Q2.

The state Q0 is a completely stopped state, and thus is also referred to as a stopped state (or an OFF state).

Meanwhile, the state Q1 is a normal startup state and is a state in which the MFP stands by for various processes (a standby state). The standby state Q1 is a state in which the individual functions of the MFP 10 are usable, that is, a state in which it is possible to perform jobs (a state in which preparation for performing jobs has been completed), and is also referred to as a ready state.

Another state Q2 is a non-stopped state in which power consumption is less than that in the standby state (the ready state) Q1, and is also referred to as a power saving state. The power saving state Q2 is also referred to as a sleep state. The sleep state Q2 is implemented, for example, by stopping or suppressing supply of power to some devices (processing circuits) of the MFP 10.

Also, in the present embodiment, the sleep state Q2 is divided into a plurality of states according to the degree of power saving. Specifically, the sleep state Q2 is divided into two states, i.e. a first sleep state Q21 (also referred to as a first power saving state) and a second sleep state Q22 (also referred to as a second power saving state). Power consumption in the second sleep state Q22 is less than power consumption in the first sleep state Q21, and power consumption in the second sleep state Q22 can achieve a relatively high power saving effect. Specifically, the first sleep state Q21 is a sleep state in which power is continuously supplied to the main CPU 31, and the second sleep state Q22 is a sleep state in which supply of power to the main CPU 31 is in a stopped state. In other words, in the first sleep state Q21, the main CPU 31 has a power-on state, and in the second sleep state Q22, the main CPU 31 has a power-off state.

<Power-Off Operation from Ready State>

Figure 4:
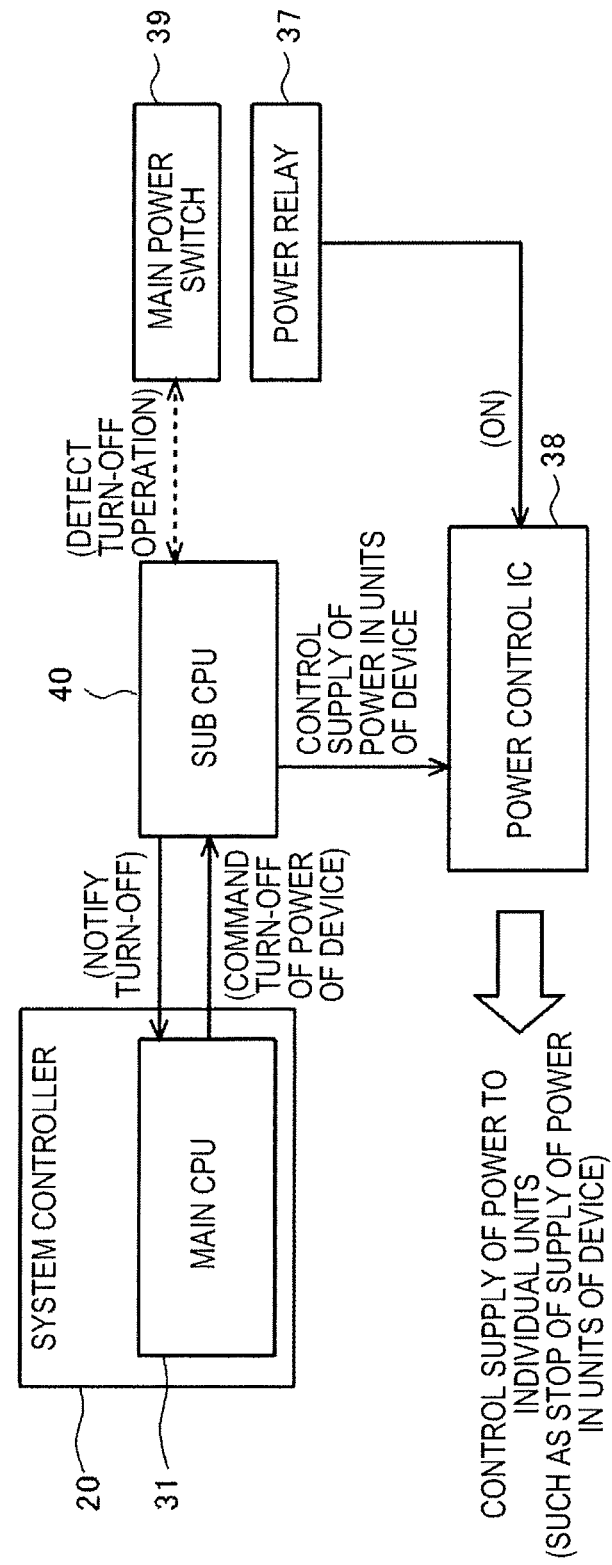
FIG. 4 is a conceptual view illustrating the first half of an operation after a power-off operation.

FIG. 4 is a conceptual view illustrating a power control operation in a normal operation. As shown in FIG. 4, when the MFP 10 is in the ready state Q1, the sub CPU 40 detects a turn-off operation and a turn-on operation on the main power switch 39, and notifies the detection result to the main CPU 31. For example, if the sub CPU 40 detects a turn-off operation on the main power switch 39, the sub CPU 40 notifies the main CPU 31 that the turn-off operation has been detected. The main CPU 31 controls supply of power to the individual units of the MFP 10 in cooperation with the power unit 36.

When the MFP 10 is in the ready state Q1, if a turn-off operation is performed on the main power switch 39, the main CPU 31 starts a predetermined process (such as a snapshot data acquiring process) in response to the turn-off operation.

Then, if the snapshot data acquiring process is completed, the power unit 36 gradually stops supply of power to the individual units including the main CPU 31 and so on. More specifically, the main CPU 31 sequentially transmits commands (power control commands) related to power control in units of a device to the sub CPU 40, and the sub CPU 40 performs a power supply stopping process based on the power control commands in cooperation with the power unit 36. In other words, in response to the commands from the main CPU 31, a power supply stopping process is performed in units of a device.

Figure 5:
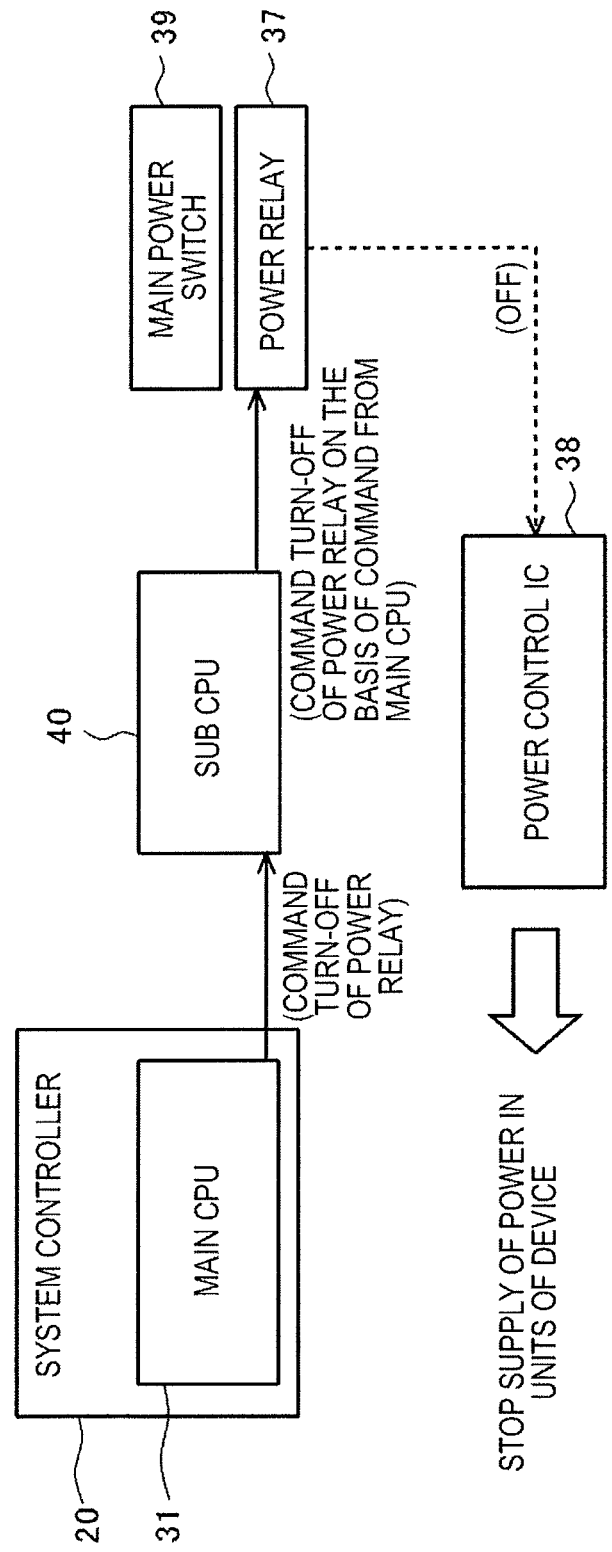
FIG. 5 is a conceptual view illustrating the second half of the operation after the power-off operation.

Further, finally, as shown in FIG. 5, the main CPU 31 transmits a turn-off command for turning off the power relay 37, to the sub CPU 40, and in response to the turn-off command from the main CPU 31, the sub CPU 40 transmits a turn-off command for turning off the power relay 37, to the power relay 37. Then, on the basis of the corresponding turn-off command, the power relay 37 interrupts supply of power to the power control IC 38, whereby supply of power from the power control IC 38 to the individual units is stopped at the same time. In other words, a power interrupting process is performed by the power relay 37.

Thereafter, if a turn-on operation is performed on the main power switch 39, supply of power to the sub CPU 40 and the main CPU 31 through the power relay 37 and the power control IC 38 is started (restarted). Also, the sub CPU 40 notifies the main CPU 31 that the turn-on operation has been detected. In response to the corresponding notification and the like, the main CPU 31 determines that it is required to perform a high-speed startup process using snapshot data, and performs the corresponding high-speed startup process. Therefore, the MFP 10 can very quickly transition from the stopped state Q0 to the ready state Q1.

COMPARATIVE EXAMPLE

It is assumed a technology (also referred to as a comparative example) in which a power interrupting process is performed only on the basis of a power relay turn-off command from the main CPU 31 in the abovementioned operation as shown in FIG. 5. In this comparative example, in a case where a power relay turn-off command is not transmitted from the main CPU 31, a power interrupting process using the power relay 37 is not performed.

However, as described above, in some processes such as the snapshot data acquiring process after a turn-off operation on the main power switch 39, some situations may occur, for example, the main CPU 31 may run out of control. In the comparative example, in those situations, for example, in a case where the main CPU 31 runs out of control, since a power relay turn-off command from the main CPU 31 (a power supply stop command from the main CPU 31) is not transmitted, there is a problem in which it is impossible to perform a power interrupting process.

<Summary of Operations According to Present Embodiment>

For this reason, in the present embodiment, it is proposed a technology capable of performing a power interrupting process using the power relay 37 and so on even in such a case where the main CPU 31 runs out of control.

Figure 6:
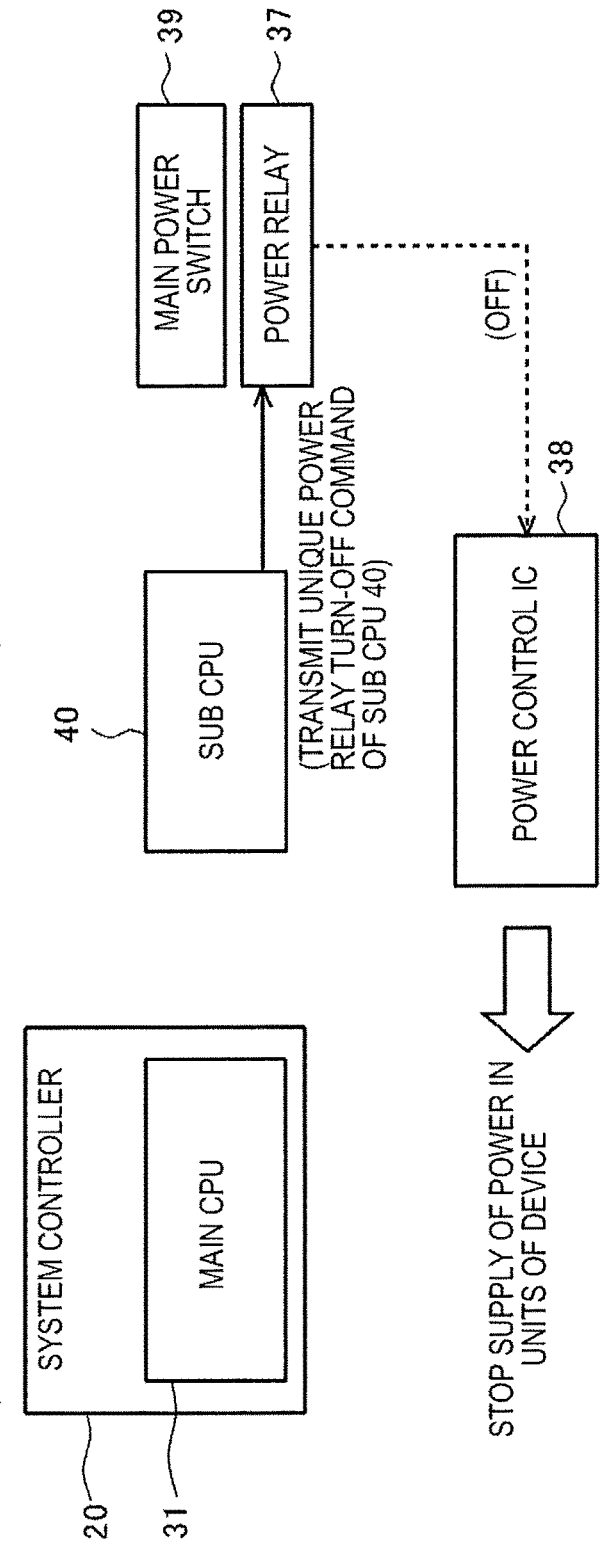
FIG. 6 is a conceptual view illustrating a forced turn-off operation which is performed by a sub CPU after a power-off operation.

Specifically, the sub CPU 40 determines whether a predetermined condition related to the result of monitoring of the operating state of the main CPU 31 is satisfied. Further, even in a case where a power supply stop command from the main CPU 31 is not received after a turn-off operation on the main power switch 39, if the predetermined condition is satisfied, the sub CPU 40 performs control to forcibly stop supply of power to the individual units of the MFP 10 (forced turn-off control). In the forced turn-off control, as shown in FIG. 6, the sub CPU 40 transmits its unique power relay turn-off command (which does not depend on the power supply stop command from the main CPU 31) (a unique power supply stop command of the sub CPU 40) to the power relay 37, whereby supply of power from the power relay 37 to the power control IC 38 is stopped, whereby supply of power from the power control IC 38 to the individual units of the MFP 10 is interrupted (stopped).

<Detailed Operations According to Present Embodiment>

Hereinafter, this aspect will be described in more detail with reference to FIG. 7 and so on.

Figure 7:
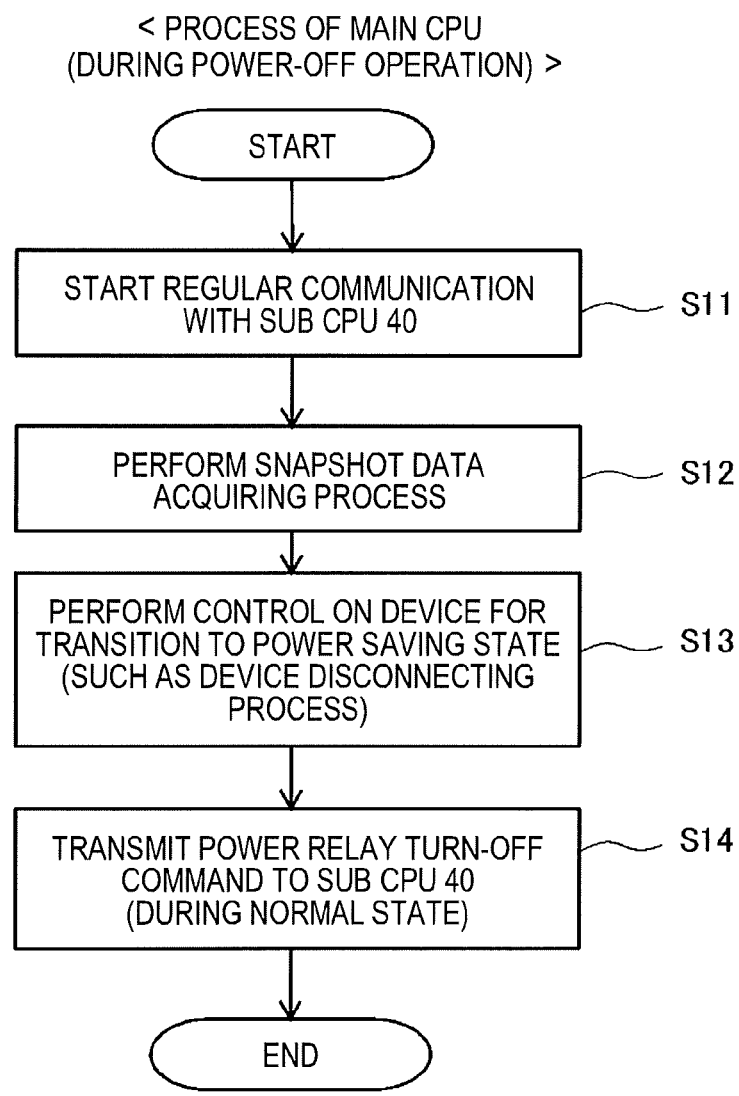
FIG. 7 is a flow chart illustrating an operation of a main CPU.

FIG. 7 is a view illustrating an operation according to the present embodiment, more specifically, an operation of the main CPU 31.

First, if the user performs a turn-off operation on the main power switch 39 when the MFP 10 is in the ready state Q1, the sub CPU 40 detects the corresponding turn-off operation.

Then, the sub CPU 40 notifies the main CPU 31 that the turn-off operation has been detected (see FIG. 4). In response to this notification, the main CPU 31 starts regular communication (FIG. 8) with the sub CPU 40 (STEP S11 (FIG. 7)).

Figure 8:
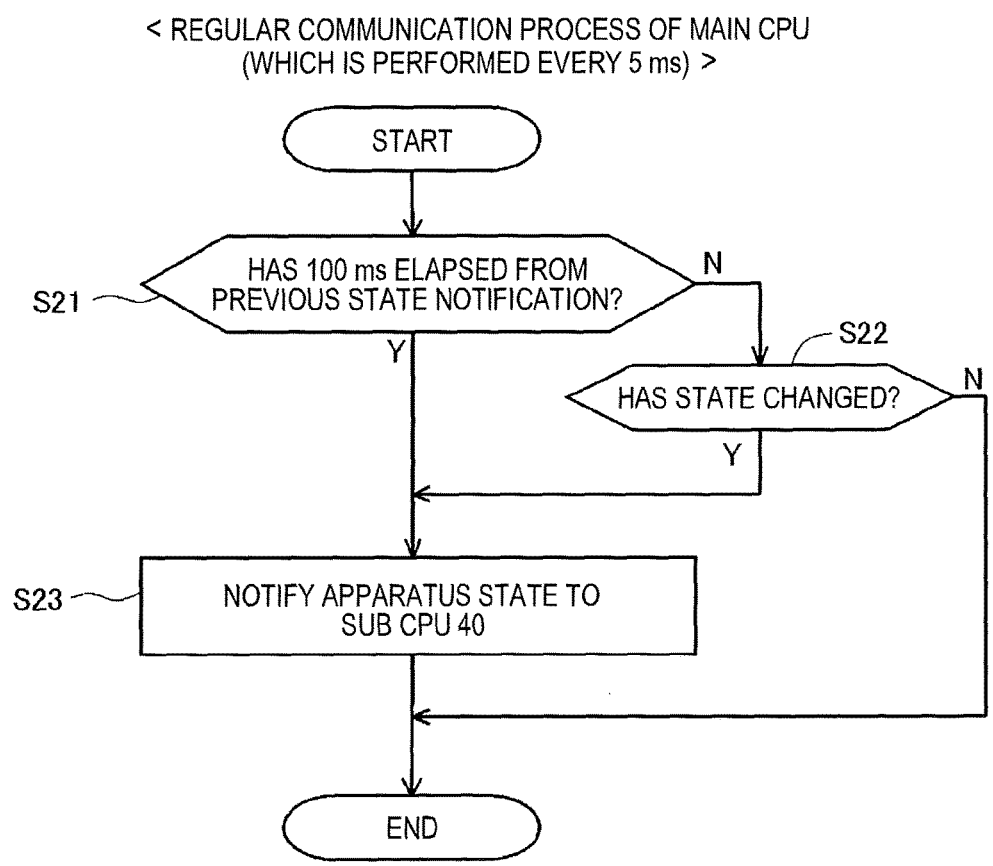
FIG. 8 is a flow chart illustrating a regular communication operation of the main CPU.

FIG. 8 is a flow chart specifically illustrating a regular communication operation of the main CPU 31 which is performed separately from the operation of FIG. 7. The regular communication operation of FIG. 8 is performed at intervals of a very short time (for example, every 5 ms (milliseconds)).

In the regular communication, as shown in FIG. 8, in principle, at intervals of a time T1 (for example, 100 ms), the main CPU 31 notifies the state (apparatus state) of the MFP 10 to the sub CPU 40. Specifically, if the main CPU 31 determines that the time T1 (100 ms) has elapsed from the previous state notification in STEP S21, it transmits a new state notification to the sub CPU 40 (STEP S23). Further, even in a case where the time T1 (100 ms) has not elapsed yet from the previous state notification ("NO" in STEP S21), if the state of the MFP 10 has changed (from the content of the previous notification) ("YES" in STEP S22), the main CPU transmits a new state notification to the sub CPU 40 (STEP S23).

As described above, the main CPU 31 performs regular communication with the sub CPU 40 at intervals of the time T1 (100 ms).

After start of the regular communication, in STEP S12, in response to the abovementioned turn-off operation on the main power switch 39, the main CPU 31 performs a snapshot data acquiring process (more specifically, a process of acquiring snapshot data) and so on.

Then, if the snapshot data acquiring process is completed, the power unit 36 gradually stops supply of power to the individual units including the main CPU 31 and so on (STEP S13). In other words, in response to a command from the main CPU 31, a power supply stopping process is performed in units of a device (refer to FIG. 4 together). The corresponding process is a process of gradually stopping supply of power to the individual units (i.e. a process of sequentially disconnecting devices), and is also referred to as a "device disconnecting process" or the like.

Then, finally, as shown in FIG. 5, the main CPU 31 transmits a command for turning off the power relay 37, to the sub CPU 40, and on the basis of the turn-off command from the main CPU 31, the sub CPU 40 transmits a command for turning off the power relay 37, to the power relay 37. Then, on the basis of the corresponding turn-off operation, the power relay 37 turns off supply of power to the power control IC 38, whereby supply of power from the power control IC 38 to the individual units is stopped at the same time. In other words, the power relay 37 performs a power interrupting process. Also, the turn-off command from the main CPU 31 is a power-off command according to a regular procedure, and thus is also referred to as a regular power-off command.

However, as described above, for example, in a case where the main CPU 31 runs out of control, as shown in FIG. 5, the turn-off command from the main CPU 31 may not cause a power-off process (a power interrupting process of the power relay 37) to be performed. Specifically, in any one stage of STEPS S12 to S14, an abnormal state of the main CPU 31 or the like may occur, whereby it may become impossible to transmit a power-off command from the main CPU 31 to the sub CPU 40.

In the present embodiment, in order to cope with such a situation, the sub CPU 40 performs an operation of monitoring the main CPU 31. More specifically, as will be described below, in STEP S70 (see FIG. 10, FIG. 11, and so on), a monitoring operation using the regular communication operation related to the state notification (see STEP S23 of FIG. 8) from the main CPU 31 is performed.

Figure 10:
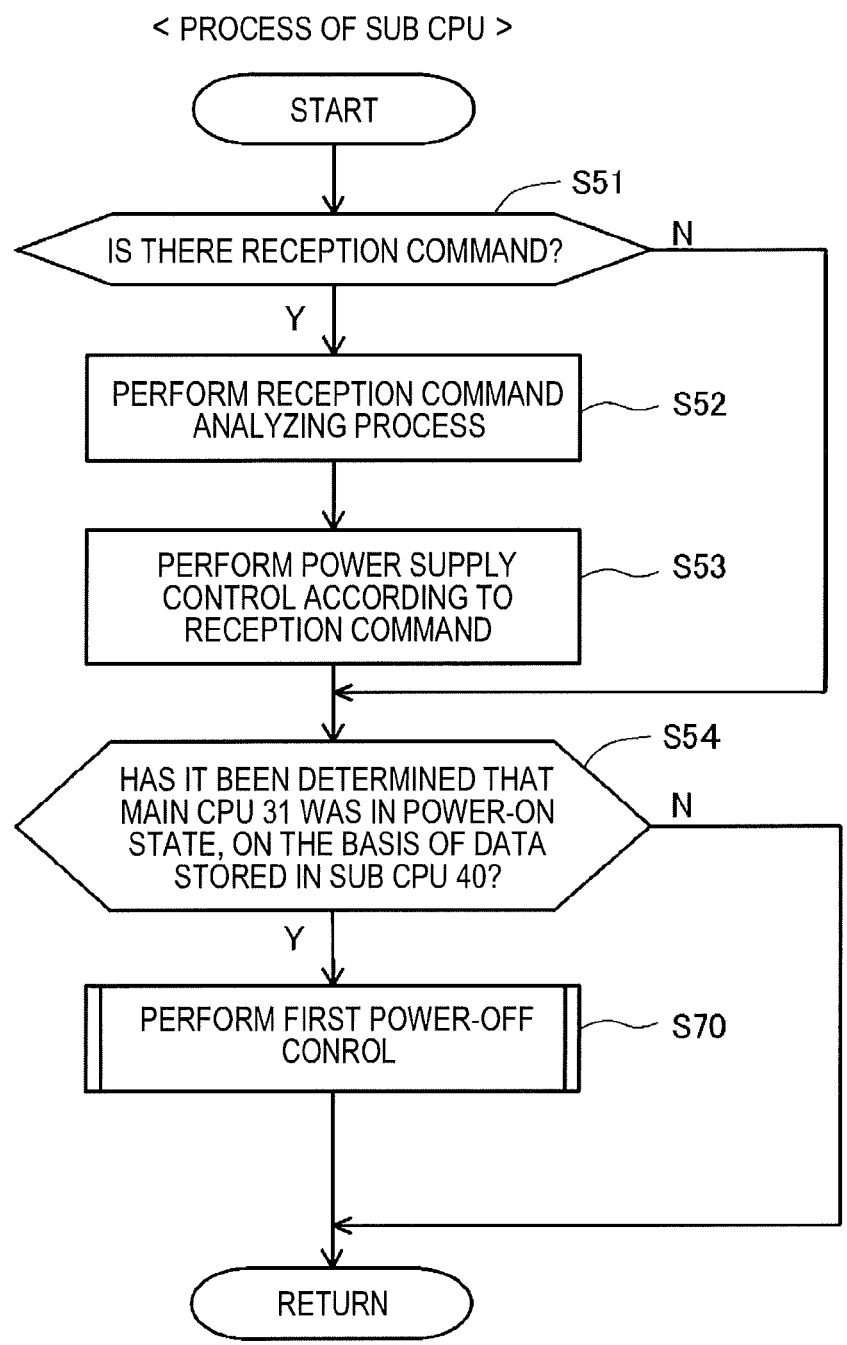
FIG. 10 is a flow chart illustrating an operation of the sub CPU.
Figure 11:
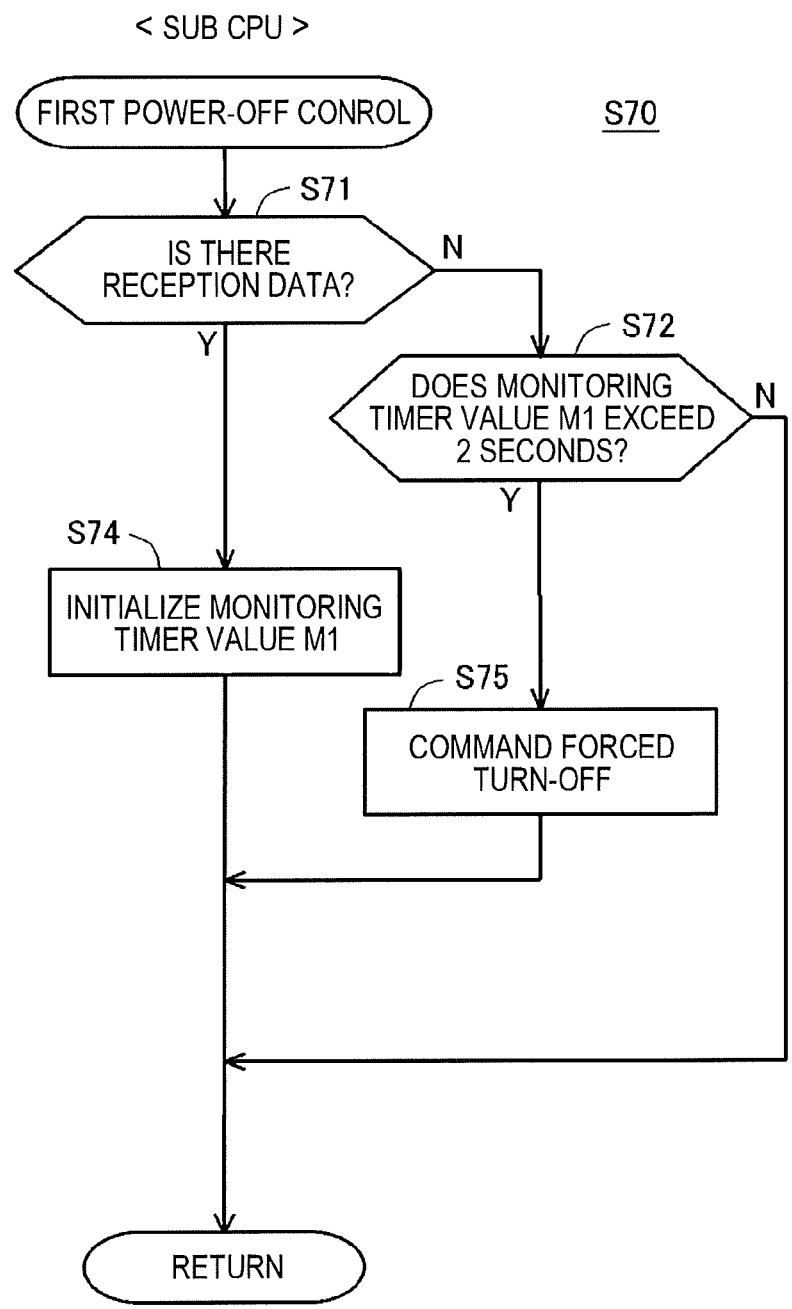
FIG. 11 is a flow chart illustrating an operation (a subroutine) of the sub CPU.

FIG. 10 is a flow chart illustrating an operation of the sub CPU 40. The operation of FIG. 10 is performed at intervals of a very short time (for example, every 5 ms (milliseconds)). Also, after a turn-off operation on the main power switch 39, each of monitoring timer values M1 is initialized immediately before the operation of FIG. 10 is performed for the first time.

In STEP S51 of FIG. 10, the sub CPU 40 determines whether there is a power control command (a reception command) received from the main CPU 31. In a case where there is no reception command (power control command), the process proceeds to STEP S54; whereas in a case where there is a reception command, the process proceeds to STEP S52.

In STEP S52 of FIG. 10, the sub CPU 40 performs a process of analyzing the command (the reception command) received from the main CPU 31.

Subsequently, in STEP S53, the sub CPU 40 performs power supply control according to the corresponding reception command. For example, in the device disconnecting process (STEP S13 of FIG. 7) of the main CPU 31, if power supply stop commands in units of a device are received from the main CPU 31, on the basis of the power supply stop commands (the power control commands) in units of a device, the sub CPU 40 stops supply of power to designated devices, using the power control IC 38 (refer to FIG. 4 together). Also, in the case where the abovementioned power-off commands (regular power-off commands) from the main CPU 31 (STEP S14) have been received, the sub CPU 40 stops supply of power to the MFP 10 through the power relay 37 at the same time (FIG. 5).

In STEP S54, on the basis of a prior notification (to be described below) from the main CPU 31, the sub CPU 40 determines whether the main CPU 31 is in a power-off state.

In this regard, in the present embodiment, it is assumed that the main CPU 31 notifies the apparatus state of the MFP 10 to the sub CPU 40 at each transition time (at each appropriate time).

Figure 9:
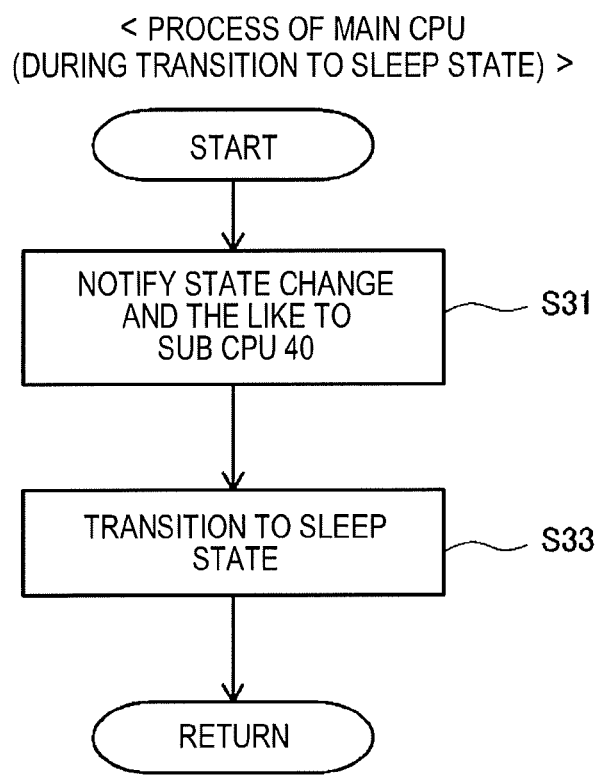
FIG. 9 is a flow chart illustrating an operation of the main CPU (during a transition to a sleep state).

For example, in a case where the MFP 10 starts up, and transitions from the stopped state Q0 to the startup state (the ready state) Q1, the main CPU 31 notifies the current apparatus state (the startup state Q1) of the MCP 13 to the sub CPU 40. Also, if the MFP 10 transitions from the startup state Q1 to the sleep state Q2 (such as Q21 or Q22), the main CPU 31 notifies the state transition to the sub CPU 40 in advance (until the MFP transitions to the sleep state Q2). For example, immediately before a transition to the sleep state Q22 (see STEP S33 of FIG. 9), the main CPU notifies the content of the state transition of the MFP 10 ("the transition to the sleep state Q22") to the sub CPU 40 (see STEP S31 of FIG. 9). Even in a case where the MFP transitions from the first sleep state Q21 to the second sleep state Q22, similarly, notification of the state transition (specifically, notification of the state transition to the second sleep state Q22) and so on are performed. Also, even in a case where the MFP 10 returns from the sleep state Q2 to the startup state Q1, similarly, notification of the state transition (specifically, notification of the state transition to the startup state Q1) is transmitted from the main CPU 31 to the sub CPU 40.

Also, the sub CPU 40 stores the content of each notification from the main CPU 31 (the apparatus state of the MFP 10) in a storage unit (not shown in the drawings) which is under the control of the sub CPU. The sub CPU 40 can recognize the state (apparatus state) of the MFP 10 on the basis of the notification content (the latest notification content) stored.

Also, if a prior notification representing that the main CPU 31 is in the power-off state (the MFP 10 is in the sleep state Q22) is not received from the main CPU 31, the sub CPU 40 performs the operations of STEP S70 and the subsequent steps. In other words, if a notification representing that the main CPU 31 has transitioned to the sleep state Q22 (the main CPU 31 has transitioned to the power-off state) is received from the main CPU 31 in advance before a turn-off operation, the sub CPU 40 determines that it is unnecessary to consider a situation in which the main CPU 31 runs out of control, and the like, and does not perform the processes of STEP S70 and the subsequent steps.

In STEP S70, a monitoring process and the like related to the operating state of the main CPU 31 is performed. Specifically, whether a predetermined condition related to the result of the monitoring of the operating state of the main CPU (a condition for determining whether the sub CPU 40 needs to perform forced turn-off control) is satisfied is determined.

Specifically, in STEP S70 (refer to FIG. 11 together), whether a first condition related to the result of the monitoring of the operating state of the main CPU 31 is satisfied is determined. If the first condition is satisfied, the sub CPU 40 performs forced turn-off. The first condition is a condition in which regular communication between the main CPU 31 and the sub CPU 40 should be cut off for a predetermined period after a turn-off operation on the main power switch 39.

Specifically, in a case where there is reception data (unprocessed reception data) related to a state notification from the main CPU 31 (see STEP S23 of FIG. 8) ("YES" in STEP S71), a monitoring timer value M1 is initialized (STEP S74).

Meanwhile, in a case where there is no reception data (unprocessed reception data) related to a state notification from the main CPU 31, the process proceeds from STEP S71 to STEP S72.

Then, after a turn-off operation on the main power switch 39, in a case where the timer value M1 exceeds a predetermined period TH1 (here, 2 seconds) (in a case where 2 seconds have elapsed without performing resetting in STEP S74) ("YES" in STEP S72), it is determined that regular communication between the main CPU 31 and the sub CPU 40 has been cut off for the predetermined period (the first condition is satisfied), and the process proceeds to STEP S75. In STEP S75, the sub CPU 40 transmits its unique power relay turn-off command (which does not depend on a power supply stop command from the main CPU 31) to the power relay 37. As a result, supply of power from the power relay 37 to the power control IC 38 is stopped, and supply of power from the power control IC 38 to the individual units of the MFP 10 is interrupted (stopped).

In a case where the monitoring timer value M1 is less than 2 seconds ("NO" in STEP S72), the process of STEP S70 is finished once without performing both of the STEPS S74 and S75. In a case where the monitoring timer value M1 is equal to the predetermined period TH1, the process of STEP S75 may be performed, or may not be performed.

The abovementioned operation is performed by the main CPU 31, the sub CPU 40, and so on.

Also, in the present embodiment, the case where a turn-off operation on the main power switch 39 is performed in the startup state Q1 has been mainly taken as an example. However, for example, in the power saving state Q22, a turn-off operation on the main power switch 39 may be performed. In this case, the main CPU 31 needs only to start the operation of FIG. 7 (STEPS S11 to S14) after the turn-off operation is performed on the main power switch 39 and a returning process from a sleep state is completed (specifically, at a time when returning from the sleep state Q22 to the startup state Q1 (or the sleep state Q21) is completed once). Also, the sub CPU 40 needs only to start the same operation as the above-described operation (see FIG. 10) immediately after the turn-off operation. In the operation of FIG. 10, in a case where the MFP 10 is in the sleep state Q22 when the turn-off operation is performed on the main power switch 39, at the time of the turn-off operation, the process does not proceed from STEP S54 (see FIG. 10 and so on) to STEP S70, and thus the operations of STEP S70 and so on are not started. Thereafter, if the latest notification representing that the MFP has returned to the startup state Q1 or the like is transmitted from the main CPU 31 (the main CPU 31 having returned to the power-on state) to the sub CPU 40, the sub CPU 40 needs only to determine that the main CPU 31 has returned to the power-on state, on the basis of the latest notification, in STEP S54, and perform the operations of STEP S70 and the subsequent steps.

Also, in a case where a turn-off operation on the main power switch 39 is performed in the power saving state Q21, it is only needed to perform the same operation as that in the case where a turn-off operation on the main power switch 39 is performed in the startup state Q1.

<Effects of Present Embodiment>

As described above, after a turn-off operation on the main power switch 39, the sub CPU 40 monitors the operating state of the main CPU 31 (STEP S70). Then, after the turn-off operation, even if a power supply stop command from the main CPU 31 is not received, if the predetermined condition related to the result of the monitoring of the operating state of the main CPU 31 (here, the first condition) is satisfied, the sub CPU 40 performs forced turn-off control for forcibly stopping supply of power to the individual units of the MFP 10. Therefore, after the turn-off operation on the main power switch 39, in a case where the main CPU 31 performs a predetermined process (such as a snapshot data acquiring process), it is possible to more appropriately turn off the power of the MFP 10 while appropriately considering the operating state of the main CPU 31.

Especially, if the first condition (the condition in which regular communication between the main CPU 31 and the sub CPU 40 should be cut off for the predetermined period after a turn-off operation on the main power switch 39) is used, it is possible to detect an abnormal state of the main CPU 31 surely and early (for example, in about one second or two seconds).

Also, in the above-described embodiment and the like, if not only the abovementioned predetermined condition (such as the first condition) but also a condition in which it should be determined that the main CPU 31 is in the startup state Q1 or the sleep state Q21 (i.e. the main CPU 31 is in the power-on state) (also referred to as a condition C20) is satisfied on the basis of a notification related to the operating state of the main CPU 31 (YES in STEP S54), the forced turn-off control is performed. Therefore, it is possible to achieve the following advantages.

In a case where the main CPU 31 is in the power-on state, the main CPU 31 may run out of control. Therefore, if determination based on not only the condition in which the main CPU 31 should be in the power-on state but also the predetermined condition (such as the first condition) is performed, it is possible to accurately perform a forced turn-off operation.

Especially, in a case where the MFP returns from the sleep state Q22 to the startup state Q1 or the like once in response to a turn-off operation on the main power switch 39, and the predetermined process (such as the snapshot data acquiring process) is performed, a certain amount of time or more (for example, 2 seconds or more) is required to return from the sleep state Q22. In this situation, in a case where forced turn-off is performed if only the first condition is satisfied, the timer value MI may reach a predetermined value TH1 before the main CPU 31 returns from the OFF state to the ON state, causing a malfunction (causing forced turn-off control to be erroneously performed). In contrast with this, if determination based on the above-mentioned predetermined condition (such as the first condition) is performed when the condition C20 is satisfied, and a forced turn-off process is performed, it is possible to avoid the above-mentioned problem.

<Modifications of Present Embodiment>

Also, in the present embodiment, in STEP S70 (see FIG. 11), only whether the first condition is satisfied is considered. However, the present invention is not limited thereto. In addition to the first condition, whether a different second condition (to be described below) is satisfied may be considered. Specifically, in a case where at least one of the first condition and the second condition is satisfied, forced turn-off may be performed by the sub CPU 40. The second condition is a condition in which there should be no response to a communication request for checking for an alive state transmitted from the sub CPU 40 to the main CPU 31 after a turn-off operation on the main power switch 39 (a condition in which the corresponding response should not be returned in a predetermined period).

Figure 12:
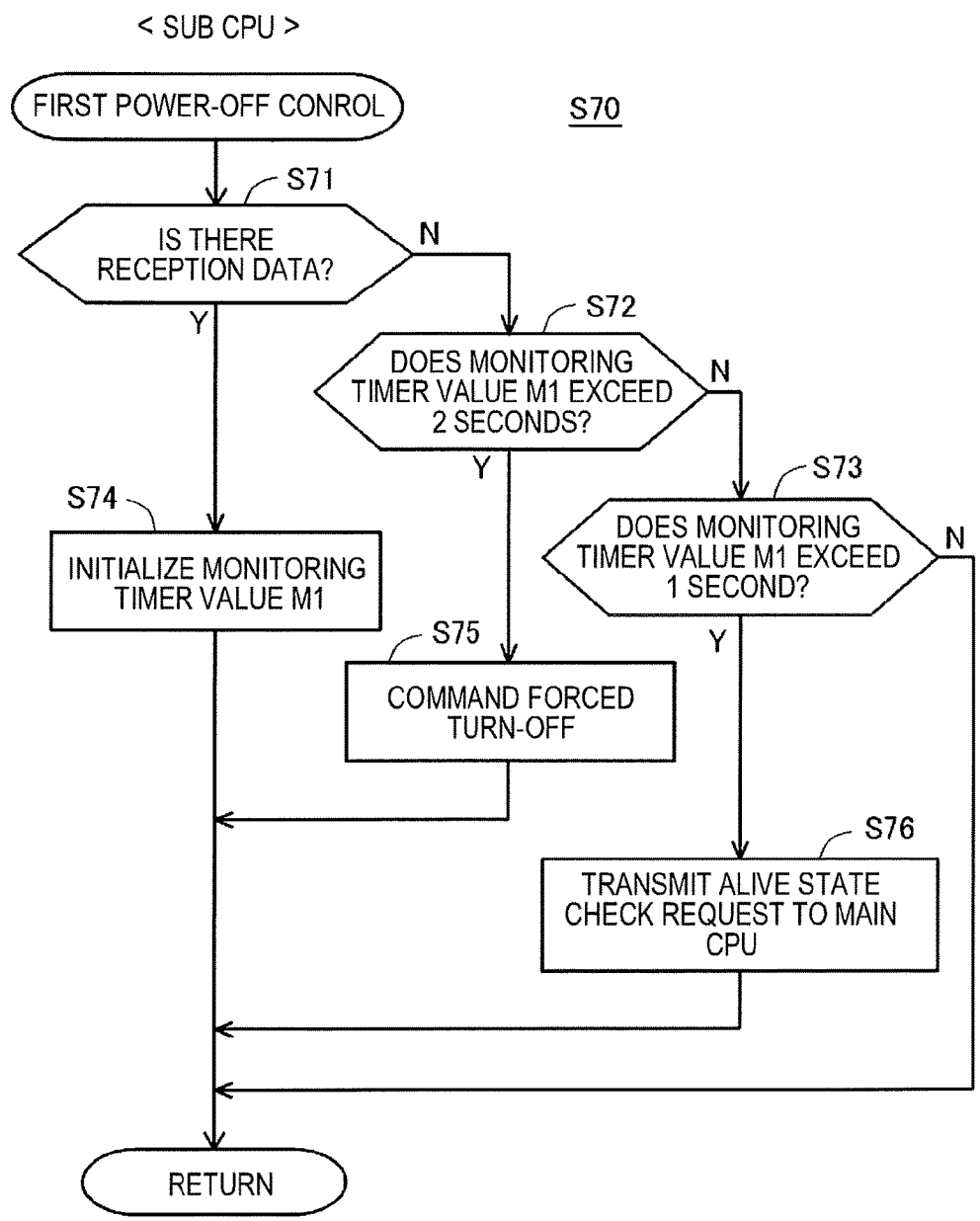
FIG. 12 is a flow chart illustrating an operation (a subroutine) according to a modification.

FIG. 12 is a view for explaining an operation according to the corresponding modification. FIG. 12 is different from FIG. 11 in that it further has STEPS S73 and S76.

After a turn-off operation on the main power switch 39, if the timer value M1 does not exceed the predetermined period TH1 (here, 2 seconds) and exceeds a value TH2 (a value smaller than the value TH1) (for example, 1 second) (TH2<M1<TH1) ("NO" in STEP S72 and "YES" in STEP S72), the process proceeds to STEP S76. In STEP S76, the sub CPU 40 transmits an alive-state checking request to the main CPU 31. The alive-state checking request is a request (a command) representing that the main CPU 31 should give a response to the sub CPU 40 in order to check whether the main CPU 31 is alive (the main CPU is operating). If the main CPU 31 is normally operating, a response representing that the main CPU 31 is alive is transmitted from the main CPU 31 to the sub CPU 40. Also, in a case where the timer value M1 is equal to the value TH2, the process of STEP S76 may be performed, or may not be performed.

In a case where all of transmission data including the alive-state checking request from the main CPU 31 is not received in the remaining period of about 1 second (in a period of about 2 seconds from the turn-off operation on the main power switch 39), the process proceeds from STEP S72 to STEP S75, and the above-mentioned forced turn-off control is performed. In other words, in a case where the second condition (a condition in which a response to the communication request for checking for the alive state transmitted from the sub CPU 40 to the main CPU 31 should not be received from the main CPU 31 (should not be returned in 1 second)), forced turn-off control is performed by the sub CPU 40.

As described above, the second condition may be considered.

<2. Second Embodiment>

The second embodiment is a modification of the first embodiment. Hereinafter, differences from the first embodiment will be mainly described.

Figure 13:
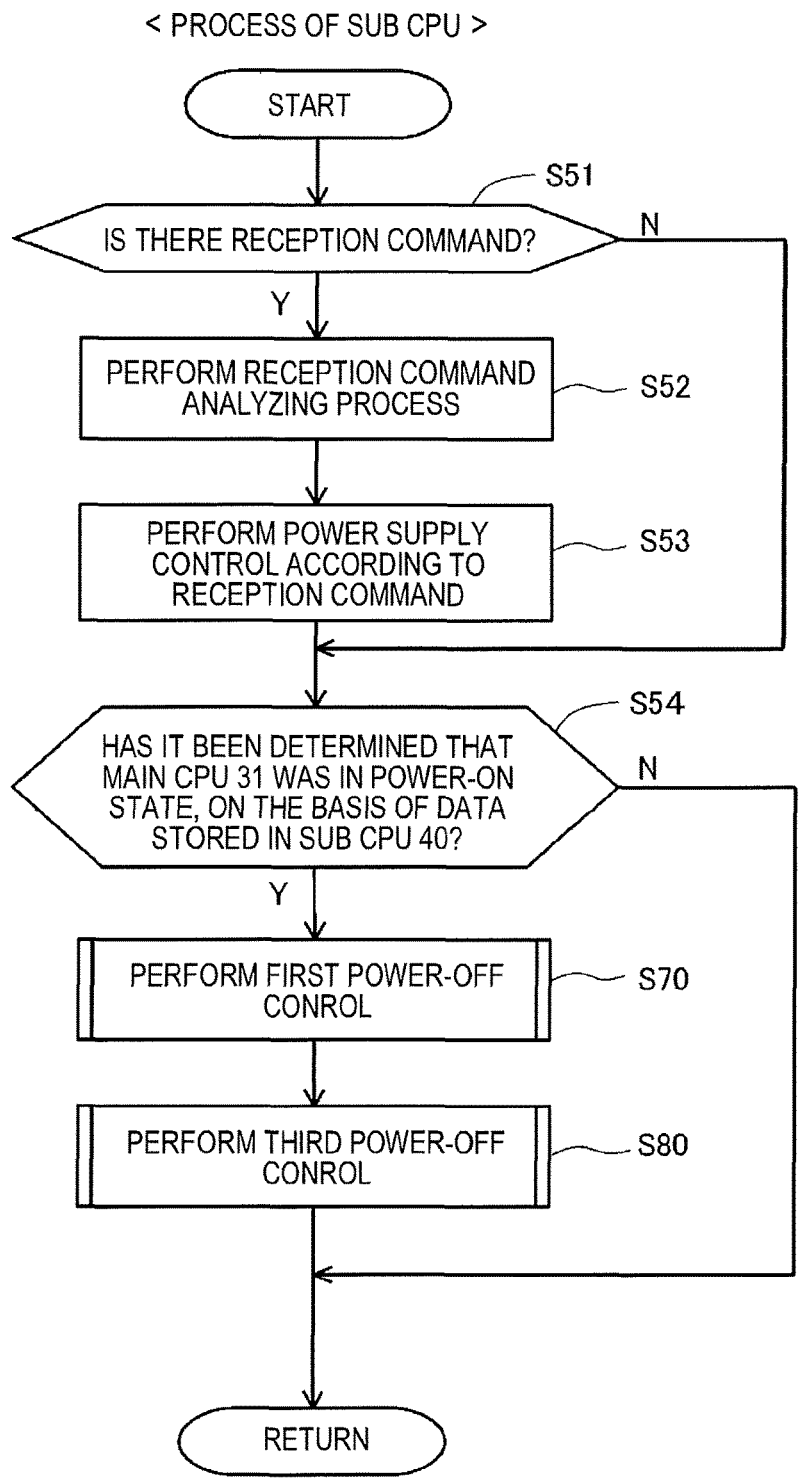
FIG. 13 is a flow chart illustrating an operation of a sub CPU according to a second embodiment.
Figure 14:
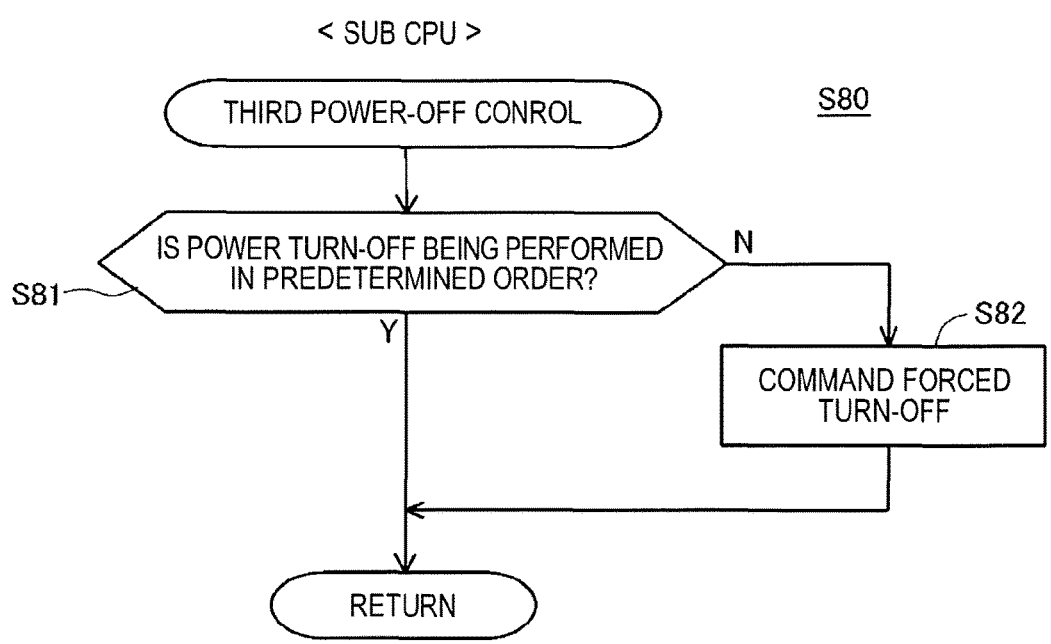
FIG. 14 is a flow chart illustrating an operation (a subroutine) of the sub CPU.

FIG. 13 is a flow chart illustrating an operation according to the second embodiment. As can be seen by comparing FIG. 13 with FIG. 10, the operation according to the second embodiment is different from the operation according to the first embodiment in that a process of STEP S80 (refer to FIG. 14 together) is further performed.

During the control of STEP S13 for a transition to the power saving state, in the normal state, the main CPU 31 stops supply of power to a plurality of devices of the MFP 10 in the predetermined order.

In the second embodiment, even in a case where the sub CPU 40 detects a power-off operation on a plurality of devices which does not accord to the predetermined order, the sub CPU 40 performs its unique forced turn-off control (STEP S80 (see FIG. 14)). In other words, even in a case where a third condition related to the result of monitoring of the operating state of the main CPU 31 is satisfied, the sub CPU 40 performs its unique forced turn-off control. The third condition is a condition in which a power-off operation on a plurality of devices which does not accord to the predetermined order (an order defined in a control list (to be described below)) should be detected by the sub CPU 40.

For example, in a case where the MFP 10 transitions from the startup state (the ready state Q1) to the OFF state (the stopped state Q0), supply of power to a plurality of devices is sequentially stopped in an order as shown in FIG. 15 (see STEP S13 of FIG. 7). Also, FIG. 15 is a view illustrating a table defining orders in which the individual devices are disconnected according to state transitions of the MFP 10. Circles of FIG. 15 represent a state in which supply of power is being performed, and a symbol "-" of FIG. 15 represents a state in which supply of power is in the stopped state. Also, numbers in parentheses next to circles corresponding to each state represent orders in which the individual devices are disconnected in a case where the MFP transitions from the corresponding state to a lower state.

In a case where the MFP 10 transitions from the startup state to the OFF state, the MFP first transitions from the startup state to the first power saving state (the sleep state Q21), and transitions from the first power saving state to the second power saving state (the sleep state Q22), and then finally transitions from the second power saving state to the OFF state.

As shown in the uppermost row of FIG. 15, here, it is assumed that, in the startup state, supply of power to the main CPU 31, the HDD 21, the USB device (such as the authentication device 25), the image reading unit 2 (a scanner), the print output unit 3 (a print engine), the operation panel unit 22, and the RAM 32 is performed.

In a case where the MFP transitions from the startup state to the first power saving state which is a state right below the startup state (a state in which power consumption is relatively small), first, supply of power to the operation panel unit 22 is stopped, and second, supply of power to the print output unit 3 (the print engine) is stopped. Also, third, supply of power to the image reading unit 2 (the scanner) is stopped, and fourth, supply of power to the HDD 21 is stopped. Also, as shown in FIG. 4, the stop of supply of power is performed on the basis of commands (power-off commands in units of a device) from the main CPU 31.

Subsequently, when the MFP transitions from the first power saving state to the second power saving state, supply of power to the USB device (such as the authentication device 25) is first stopped, and then supply of power to the main CPU 31 is also stopped.

Further, when the MFP transitions from the second power saving state to the OFF state, supply of power to the RAM 32 is stopped. Also, after supply of power to the main CPU 31 is stopped, the power control IC 38 stops supply of power on the basis of a command from the sub CPU 40.

As described above, when the MFP transitions from the startup state to the OFF state, regularly, the main CPU 31 sequentially stops supply of power to the individual devices in the order of the operation panel unit 22, the print output unit 3 (the print engine), the image reading unit 2 (the scanner), the HDD 21, and the USB device (such as the authentication device 25).

Also, the order in which supply of power to the plurality of devices is stopped is determined in view of various circumstances in advance. For example, a situation in which a turn-off operation is started can be shown for a user by first turning off the operation panel unit 22, whereby it is possible to give a feeling of security to the user. Also, with respect to the print output unit 3 (the print engine), the image reading unit 2 (the scanner), the MD 21, and so on, the stopping process is started in the order in which the time required to perform a finishing process (such as a process of returning a movable part to a home position) decreases. Therefore, it is possible to efficiently finish the process. In view of this circumstance, the order of stop of supply of power to the individual devices is determined.

Also, as described above (see FIG. 4), the sub CPU 40 sequentially receives power supply stop commands (power supply stop commands in units of a device) from the main CPU 31, and performs stop of supply of power to the individual devices in cooperation with the power control IC 38 on the basis of the received power supply stop commands. Therefore, on the basis of the power supply stop commands from the main CPU 31 and the like, the sub CPU 40 can monitor and acquire the state of supply of power to each device.

Meanwhile, in some situations such as a situation in which the main CPU 31 is running out of control, and/or a situation in which communication between the main CPU 31 and another device is abnormal, a power-off operation which does not accord to the predetermined order may be performed on the plurality of devices. Also, this event may be caused, for example, by software bugs and/or partial defects of the semiconductor memories.

Figure 16:
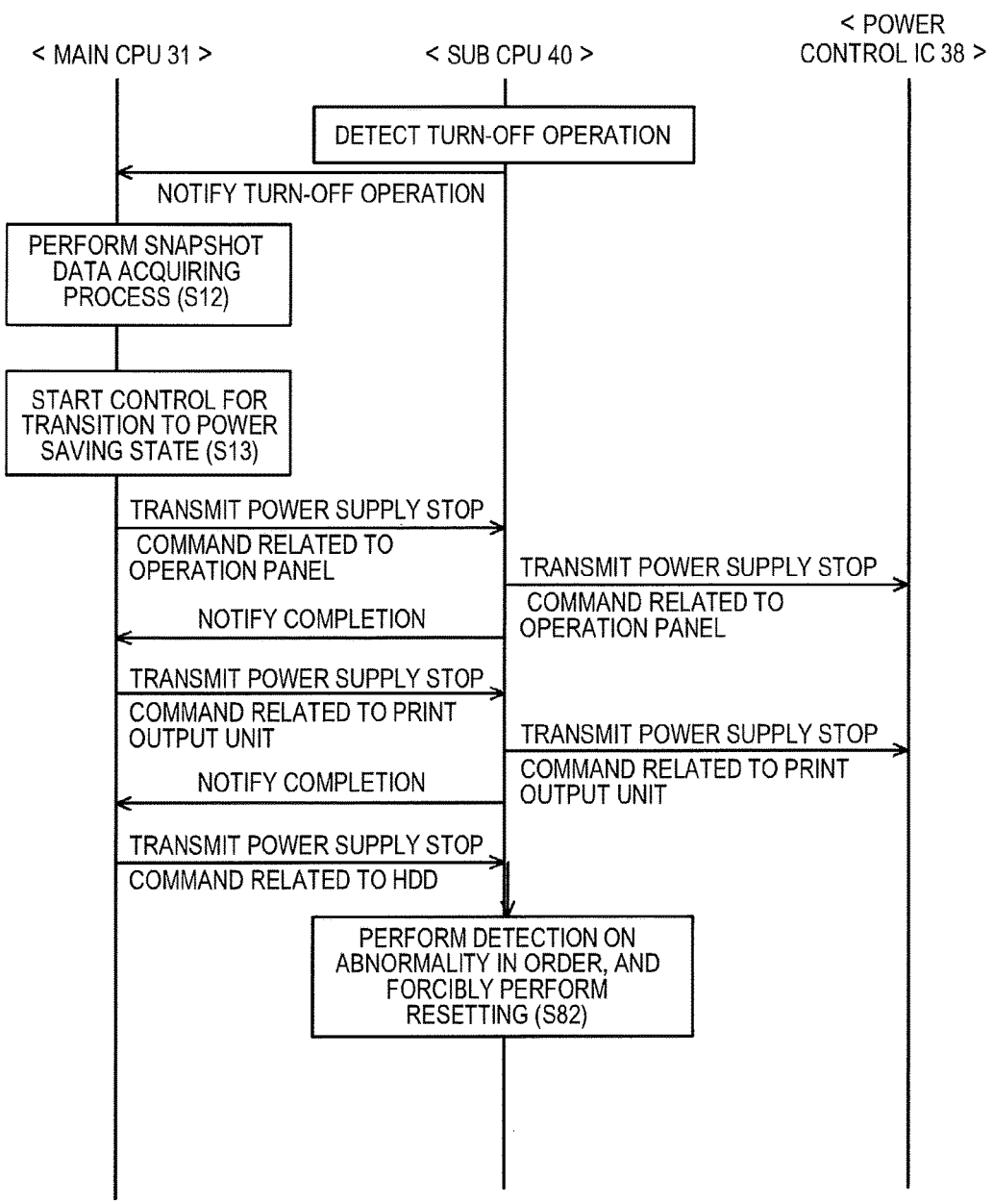
FIG. 16 is a view illustrating an operation example of an MFP after a turn-off operation on a main power switch.

For example, as shown in FIG. 16, next to the operation panel unit 22 and the print output unit 3 (the print engine), stop of supply of power to the HDD 21 (not to the image reading unit 2 (the scanner) based on the regular order) may be performed (earlier than stop of supply of power to the image reading unit 2 (the scanner)). Also, next to the image reading unit 2 (the scanner), stop of supply of power to the USB device may be performed (earlier than stop of supply of power to the HDD 21 based on the regular order).

In the present embodiment, if the sub CPU 40 determines that a power-off operation which did not accord to the predetermined power-off order related to the plurality of devices has been detected (power-off is not being performed in the regular order ("NO" in STEP S81)), the sub CPU 40 performs its unique forced turn-off control (STEP S82 (see FIG. 14)). In other words, even in a case where the third condition is satisfied, the sub CPU 40 performs its unique forced turn-off control.

FIG. 16 is a timing chart illustrating an example in which a power supply stopping process is performed in an order other than the regular order. In FIG. 16, after a turn-off operation on the main power switch 39 is detected, the main CPU 31 performs the snapshot data acquiring process (STEP S12), and then starts the control process for transitioning to the power saving state (the device disconnecting process) (the process of STEP S13).

Specifically, the main CPU 31 first transmits a command for stopping supply of power to the operation panel unit 22, to the sub CPU 40. On the basis of the corresponding command, the sub CPU 40 stops supply of power to the operation panel unit 22 in cooperation with the power control IC 38, and transmits a completion notification to the main CPU 31. Subsequently, the main CPU 31 transmits a command for stopping supply of power to the print output unit 3 (the print engine), to the sub CPU 40. On the basis of the corresponding command, the sub CPU 40 stops supply of power to the print output unit 3 in cooperation with the power control IC 38, and transmits a completion notification to the main CPU 31. Until this stage, the process according to the regular order is performed. However, thereafter, the main CPU 31 transmits a command for stopping supply of power to the HDD 21 (not to the image reading unit 2 (the scanner) based on the regular order), to the sub CPU 40.

If receiving the power supply stop command (the command for stopping supply of power to the HDD 21), the sub CPU 40 determines that a power-off operation which did not accord to the predetermined power-off order related to the plurality of devices has been detected. Then, the sub CPU 40 performs its unique forced turn-off control (STEP S82 (see FIG. 14)). In other words, it is determined that the third condition is satisfied, and the sub CPU 40 performs its unique forced turn-off control.

According to this aspect, since forced turn-off control is performed even on the basis of the third condition, it is possible to more appropriately turn off the power of the MFP 10.

Also, especially, devices actually mounted on the MFP 10 depend on the MFP 10, and devices to be mounted in one MFP 10 may be updated (added, changed, or omitted). Therefore, it is preferable to change the order of stop of supply of power according to devices actually mounted (i.e. on the basis of option components of the MFP 10). For example, as shown in FIG. 17, in a case where the HDD 21 is disconnected, the order of stop of supply of power is determined except for the corresponding device (the HDD 21). Specifically, an order in which stop of supply of power to the USB device (not to the HDD 21) is performed next to stop of supply of power to the image reading unit 2 (the scanner) is a regular order.

In the present embodiment, data tables defining power-off orders (power supply stop orders) related to the plurality of devices (see FIG. 15) are sequentially generated by the main CPU 31. Then, the main CPU 31 sequentially notifies a corresponding data table (also referred to as a control list) to the sub CPU 40 in advance (before a turn-off operation on the main power switch 39 is performed). For example, at a time immediately after startup of the MFP 10 and/or a time immediately after change in the option components of the MFP 10, the main CPU 31 updates (generates) a corresponding data table (a control list), and notifies the corresponding data table from the main CPU 31 to the sub CPU 40. Then, the sub CPU 40 stores the corresponding data table under the control of the sub CPU, and uses the corresponding data table in the determining operation of STEP S80 described above (FIGS. 13 and 14).

According to this configuration, since the updated (latest) data table (control list) accurately reflects the actual (latest) connection situation of the option devices and the like, it is possible to more accurately check the power supply stop order.

<3. Others>

Although the embodiments of the present invention have been described above, the present invention is not limited to the above-mentioned contents.

For example, in each embodiment or the like described above, other conditions may be further considered. Specifically, after a turn-off operation on the main power switch 39, whether a condition in which a communication interface (for example, a serial bus such as I2C) between the main CPU 31 and another device (such as a sound IC (not shown in the drawings)) included in the MFP 10 should not operate for a predetermined period TH4 (also referred to as a fourth condition) is satisfied may be determined (see FIG. 18). The sub CPU 40 needs only to monitor the operating state of the serial bus or the like after the turn-off operation on the main power switch 39. For example, a signal line (a common signal line) connecting the main CPU 31 and each device (for example, the sound IC) is branched, and the branch from the signal line is connected (input) to the sub CPU 40. Then, the state of the branch of the signal line connected to the sub CPU 40 needs to be monitored by the sub CPU 40.

Figure 18:
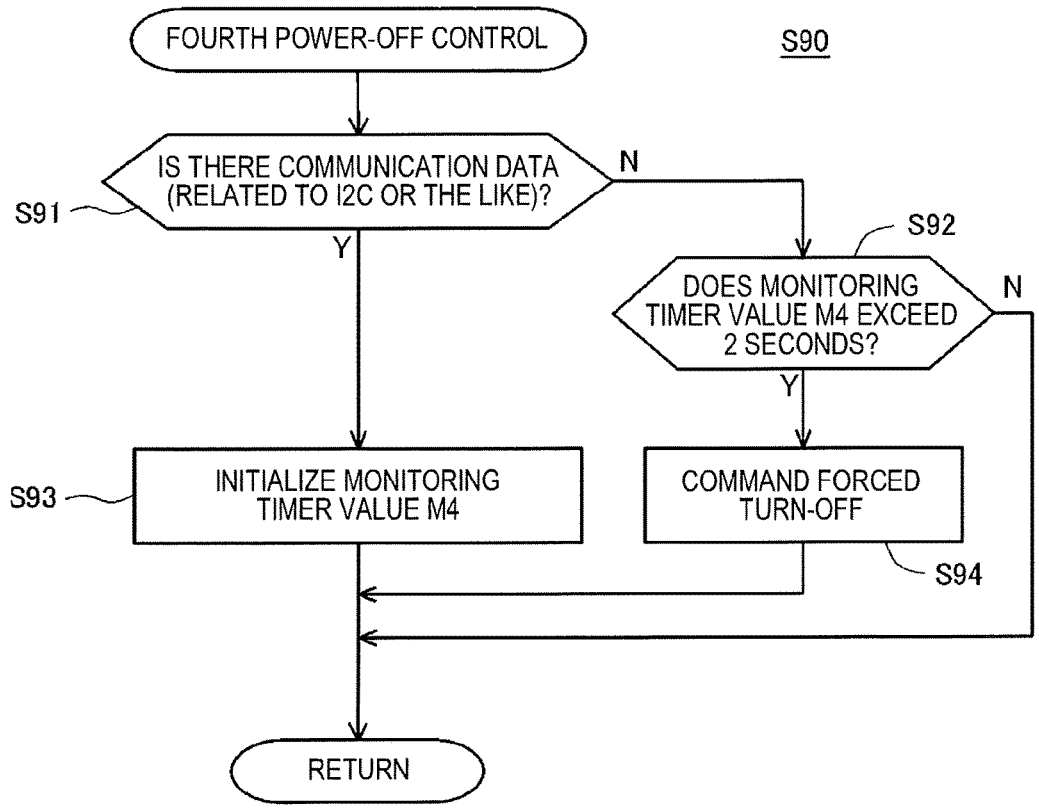
FIG. 18 is a flow chart illustrating an operation (a subroutine) according to a modification.

FIG. 18 is a flow chart illustrating the above-mentioned operation (STEP S90). Also, the operation of STEP S90 needs only to be performed, for example, immediately before or immediately after STEP S70 of FIG. 10 (and FIG. 13 and the like), or immediately after STEP S80 (refer to FIG. 19 together).

In STEP S90, whether the fourth condition (described above) related to the result of the monitoring of the operating state of the main CPU 31 is determined, and in a case where the fourth condition is satisfied, the sub CPU 40 performs forced turn-off.

Specifically, the sub CPU 40 determines whether communication (communication between the main CPU 31 and another device) using a predetermined communication interface (such as I2C) is being performed, on the basis of the operating state of the corresponding communication interface. In a case where there is communication data (unchecked (latest) communication data) in the communication interface ("YES" in STEP S91), a monitoring timer value M4 is initialized (STEP S93).

Meanwhile, in a case where there is no communication data in the communication interface, the process proceeds from STEP S91 to STEP S92.

Then, in a case where the timer value M4 exceeds the predetermined period TH4 (here, 2 seconds) (in a case where 2 seconds have elapsed without performing resetting in STEP S94) ("YES" in STEP S92), it is determined that the corresponding communication interface has not operated for the predetermined period (the fourth condition is satisfied), and the process proceeds to STEP S94. In STEP S94, the sub CPU 40 transmits its unique power relay turn-off command (which is not based on a power supply stop command from the main CPU 31) to the power relay 37. As a result, supply of power from the power relay 37 to the power control IC 38 is stopped, and supply of power from the power control IC 38 to the individual units of the MFP 10 is interrupted (stopped).

According to this aspect, since forced turn-off control is performed even on the basis of the fourth condition, it is possible to more appropriately turn off the power of the MFP 10.

Also, other conditions (conditions other than the first to fourth conditions) may be further considered.

Further, in each embodiment or the like described above, all conditions of the plurality of conditions (such as the first to fourth conditions) may be considered, or only some (at least one condition) of the plurality of conditions may be considered.

Also, in each embodiment or the like described above, in a case where any one of the first to fourth conditions is satisfied, the sub CPU 40 immediately performs forced turn-off control; however, the present invention is not limited thereto. For example, in a case where an above-mentioned predetermined condition (a predetermined condition related to the result of the monitoring of the operating state of the main CPU 31) is satisfied, the sub CPU may determine that forced turn-off control should be performed, and transmit the communication request for checking the alive state to the main CPU 31, and perform forced turn-off control if determining that there is no response to the communication request.

More specifically, for example, in STEP S70 (FIG. 11 and FIG. 12), after it is determined in STEP S72 that the first condition (and/or the second condition) is satisfied, first, the sub CPU 40 does not immediately perform the process of STEP S75 and the sub CPU 40 first transmits the communication request for checking the alive state to the main CPU 31. Thereafter, if a response to the communication request is not returned in the predetermined period (for example, 2 seconds), it is determined that there is no response to the communication request. Then, if it is determined that there is no response to the communication request, the sub CPU 40 performs forced turn-off control.

Even after it is determined in another step such as STEP S80 that the third condition is satisfied, a similar process is performed.

As described above, in a case where it is determined that the above-mentioned predetermined condition is satisfied, the sub CPU 40 may further transmit the communication request for checking for the alive state, and perform forced turn-off control if it is determined that there is no response to the communication request. In other words, the sub CPU 40 may be configured to perform inquiring on the main CPU 31 again just in case.

Also, in each embodiment described above, whether a condition in which supply of power to the MFP 10 should not be stopped in a predetermined period after a turn-off operation on the main power switch 39 (hereinafter, also referred to as an auxiliary condition) is satisfied may be further determined, and in a case where the corresponding condition is satisfied, a power-off operation may be performed. For example, as shown in FIG. 19, next to STEP S80 (see FIGS. 13 and 14) and STEP S90 (see FIG. 18), an operation of STEP S100 may be performed.

Figure 19:
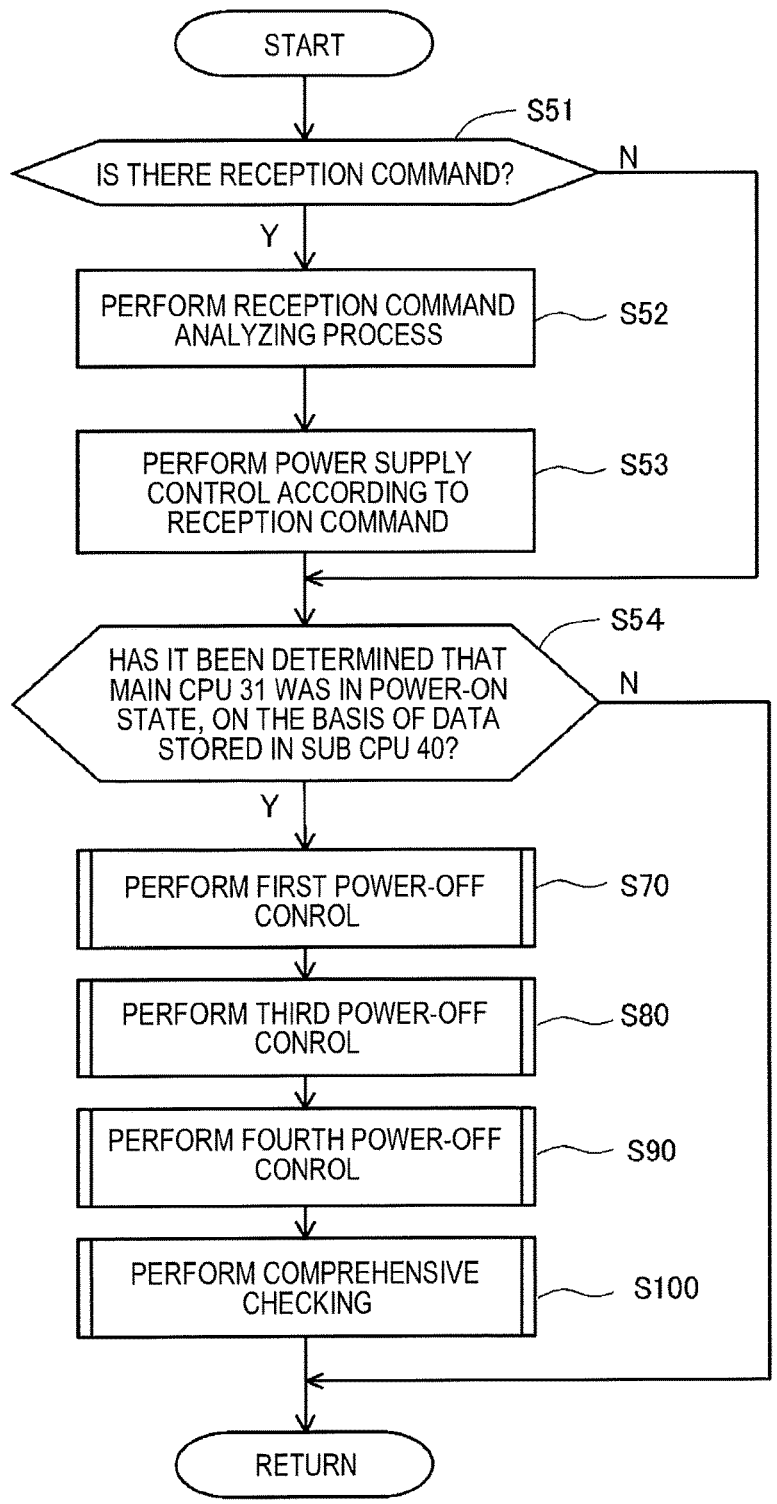
FIG. 19 is a flow chart illustrating an operation according to the modification.
Figure 20:
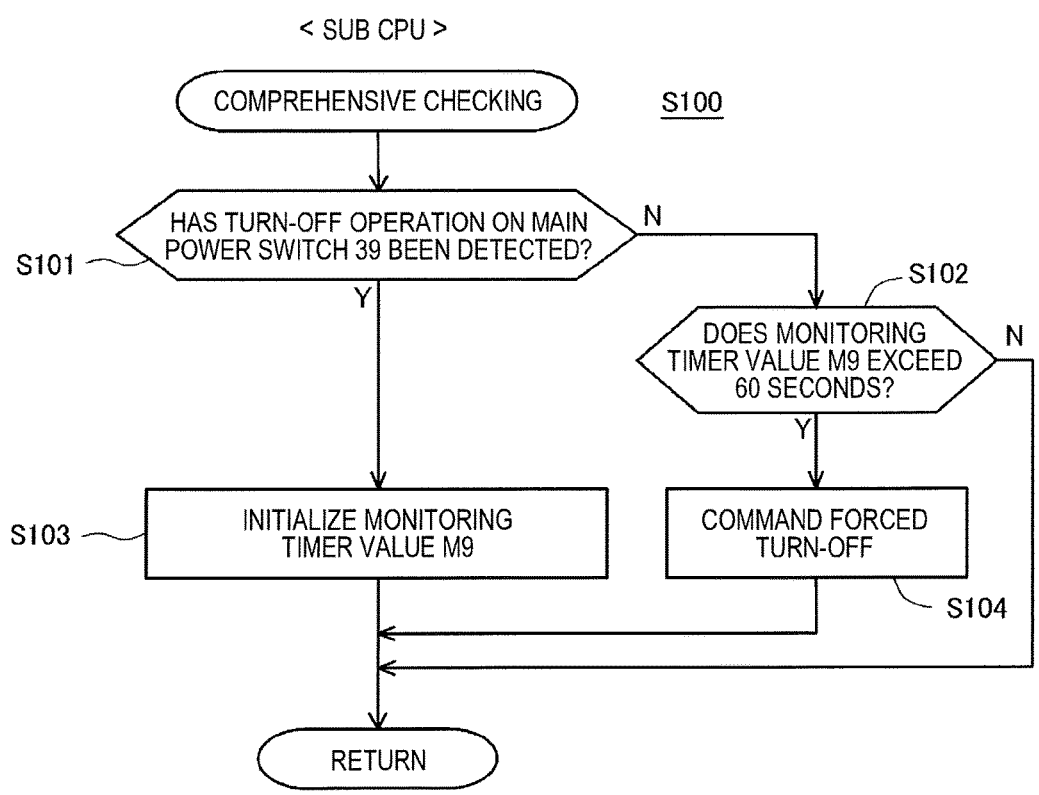
FIG. 20 is a flow chart illustrating an operation (a subroutine) according to the modification.

In STEP S100 (refer to FIG. 20 together) of FIG. 19, whether the authentication command which is a condition other than the condition related to the result of the monitoring of the operating state of the main CPU is satisfied is determined, and if the auxiliary condition is satisfied, the sub CPU 40 performs forced turn-off control. The corresponding auxiliary condition is a condition in which supply of power to the MFP 10 should not be stopped in a predetermined period TH9 (for example, 60 seconds) after a turn-off operation on the main power switch 39. The predetermined period TH9 is a period set to be longer than a time (for example, 40 seconds) required for a normal finishing process. Also, the predetermined period TH9 is a period longer than all of the above-mentioned predetermined periods TH1, TH2, and TH4.

Specifically, in a case of detecting a turn-off operation on the main power switch 39 (a state change from the ON state to the OFF state) ("YES" in STEP S101), the sub CPU 40 initializes a monitoring timer value M9 (STEP S103).

Also, in a case where there is no change in the state of the main power switch 39, the process proceeds from STEP S101 to STEP S102.

In a case where it is determined on the basis of the monitoring timer value M9 that the predetermined period TH9 (for example, 60 seconds) has not elapsed yet from the time of the turn-off operation ("NO" in STEP S102), the process of STEP S100 is finished once.

Meanwhile, in a case where it is determined that the predetermined period TH9 (for example, 60 seconds) has already elapsed from the time of the turn-off operation ("YES" in STEP S102), the sub CPU 40 transmits its unique power relay turn-off command (which is not based on a power supply stop command from the main CPU 31) to the power relay 37 (STEP S104). As a result, supply of power from the power relay 37 to the power control IC 38 is stopped, and supply of power from the power control IC 38 to the individual units of the MFP 10 is interrupted (stopped).

As described above, it is preferable to perform power-off control in a case where the auxiliary condition is satisfied, regardless of whether the above-mentioned predetermined conditions (such as the first to fourth conditions) are satisfied. In other words, it is preferable to perform power-off control if the auxiliary condition is satisfied even in a case where the above-mentioned conditions are not satisfied.

According to this configuration, if a time significantly longer than the time required for a normal stopping process elapses, it is determined that an abnormality has occurred, and power-off control is performed. In short, it is possible to comprehensively detect various abnormal states. For example, in a case where a turn-off operation on the main power switch 39 is performed in the sleep state Q22 of the MFP 10, even if the main CPU 31 runs out of control in the process of returning from the sleep state Q22 to the startup state Q1, it is possible to appropriately turn off the power of the MFP 10. In other words, a checking operation of a first stage which is first performed on the basis of an above-mentioned condition (such as the first condition to the fourth condition) makes it possible to appropriately turn off the power of the MFP 10, and a checking operation of a second stage which is further performed on the basis of the above-mentioned auxiliary condition makes it possible to more appropriately turn off the power of the MFP 10. In other words, the checking operations of two stages make it possible to more appropriately turn off the power of the MFP 10.

Also, in each embodiment described above, after the snapshot data acquiring process (STEP S12) is completed, the control process for transitioning to the power saving state (the device disconnecting process) (STEP S13) is started. However, the present invention is not limited thereto. For example, the performance of the control process for transitioning to the power saving state (STEP S13) may be started in parallel to performance of the snapshot data acquiring process (STEP S12).

Also, in each embodiment described above, as examples of predetermined processes before switching the MFP 10 to the power supply stop state, the snapshot data acquiring process (STEP S12) and the control process for transitioning to the power saving state ("the device disconnecting process") (STEP S13) have been taken; however, the present invention is not limited thereto. For example, in a case where any other process (a process of recording various data such as counter data, data for maintenance, and/or unprinted facsimile reception data stored in a volatile storage device (such as the RAM) in a non-volatile storage device (such as the eMMC) is performed as an example of predetermined processes before switching the MFP 10 to the power supply stop state, the above-described idea may be applied.

Although embodiments of the present invention have been described and illustrated in detail, it is clearly understood that the same is by way of illustration and example only and not limitation, the scope of the present invention should be interpreted by terms of the appended claims.

What is claimed is:
1. An image forming apparatus comprising:
 a main CPU that starts a predetermined process in response to a turn-off operation on a main power switch of the image forming apparatus; and
 a sub CPU that controls supply of power to individual units of the image forming apparatus on a basis of a command from the main CPU,
 wherein the sub CPU:
  performs regular communication with the main CPU after the turn-off operation, monitors the operating state of the main CPU using the regular communication, and stops supply of power to the individual units when the regular communication is not performed for a monitoring timer value for a predetermined period if a power supply stop command from the main CPU is not received after the turn-off operation, wherein:

the regular communication includes periodic notifications from the main CPU to the sub CPU concerning an apparatus state of the image forming apparatus; and the sub CPU resets the monitoring timer value if the sub CPU receives data in the regular communication.

2. The image forming apparatus according to claim 1, wherein:

the sub CPU stops supply of power to the individual units when a communication interface between the main CPU and a predetermined device included in the image forming apparatus does not operate for the predetermined period after the turn-off operation.

3. The image forming apparatus according to claim 1, wherein:

the sub CPU stops supply of power to the individual units when a response to a communication request for checking for an alive state transmitted from the sub CPU to the main CPU should not be returned from the main CPU in the predetermined period after the turn-off operation.

4. The image forming apparatus according to claim 1, wherein:

during the predetermined process, in a normal state, the main CPU stops supply of power to a plurality of devices of the image forming apparatus in a predetermined order.

5. The image forming apparatus according to claim 4, wherein:

the sub CPU receives a predetermined control list defining a power-off order related to the plurality of devices, from the main CPU, in advance, before the turn-off operation.

6. The image forming apparatus according to claim 1, wherein:

when, on the basis of a notification of the state of the main CPU transmitted from the main CPU to the sub CPU, that a condition that the main CPU is in a power-on state is satisfied, the sub CPU performs a forced turn-off control.

7. The image forming apparatus according to claim 1, wherein:

if the sub CPU determines that a forced turn-off control should be performed, and transmits a communication request for checking for an alive state, to the main CPU, and if it is determined that there is no response to the communication request, the sub CPU performs the forced turn-off control.

8. The image forming apparatus according to claim 1, wherein:

if supply of power to the image forming apparatus is not stopped in the predetermined period after the turn-off operation, the sub CPU performs a forced turn-off control, and the predetermined period is a period set to be longer than a time required for a normal finishing process.

9. A control method of an image forming apparatus, wherein:

the image forming apparatus includes:

a main CPU that starts a predetermined process in response to a turn-off operation on a main power switch of the image forming apparatus; and a sub CPU that controls supply of power to individual units of the image forming apparatus on a basis of a command from the main CPU, the control method includes:

a) performing regular communication with the main CPU after the turn-off operation;

b) monitoring the operating state of the main CPU using the regular communication, and c) stopping supply of power to the individual units when the regular communication is not performed for a monitoring timer value for a predetermined period if a power supply stop command from the main CPU is not received after the turn-off operation, wherein:

the regular communication includes periodic notifications from the main CPU to the sub CPU concerning an apparatus state of the image forming apparatus; and the sub CPU resets the monitoring timer value if the sub CPU receives data in the regular communication.

10. A non-transitory recording medium storing a computer readable program causing an image forming apparatus, including a main CPU that starts a predetermined process in response to a turn-off operation on a main power switch of the image forming apparatus, and a sub CPU that controls supply of power to individual units of the image forming apparatus on a basis of a command from the main CPU, to perform:

a) performing regular communication with a the main CPU after the turn-off operation;

b) monitoring the operating state of the main CPU using the regular communication, and c) stopping supply of power to the individual units when the regular communication is not performed for a monitoring timer value for a predetermined period if a power supply stop command from the main CPU is not received after the turn-off operation, wherein:

the regular communication includes periodic notifications from the main CPU to the sub CPU concerning an apparatus state of the image forming apparatus; and the sub CPU resets the monitoring timer value if the sub CPU receives data in the regular communication.

* * * * *